United States Patent
Gupta et al.

(10) Patent No.: US 9,693,371 B2
(45) Date of Patent: Jun. 27, 2017

(54) IOE DEVICE TRANSMISSION SIGNALING AND SCHEDULING

(71) Applicant: QUALCOMM Incorporated, San Diego, CA (US)

(72) Inventors: Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 14/684,191

(22) Filed: Apr. 10, 2015

(65) Prior Publication Data

US 2016/0302237 A1    Oct. 13, 2016

(51) Int. Cl.
| | |
|---|---|
| H04J 3/00 | (2006.01) |
| H04W 74/08 | (2009.01) |
| H04W 52/02 | (2009.01) |
| H04W 72/10 | (2009.01) |
| H04W 4/00 | (2009.01) |
| H04W 74/00 | (2009.01) |

(52) U.S. Cl.
CPC ....... *H04W 74/0891* (2013.01); *H04W 4/005* (2013.01); *H04W 52/028* (2013.01); *H04W 52/0216* (2013.01); *H04W 52/0225* (2013.01); *H04W 72/10* (2013.01); *H04W 74/004* (2013.01); *H04W 74/006* (2013.01); *H04W 74/08* (2013.01); *Y02B 60/50* (2013.01)

(58) Field of Classification Search
USPC .......... 370/260–321, 336–419; 455/436–525
See application file for complete search history.

(56) References Cited

U.S. PATENT DOCUMENTS

| | | | |
|---|---|---|---|
| 7,983,165 B2* | 7/2011 | Li | H04W 72/1231 370/235 |
| 8,385,322 B2 | 2/2013 | Colling et al. | |
| 8,520,692 B2* | 8/2013 | Li | H04W 72/1242 370/419 |
| 8,644,213 B2* | 2/2014 | Park | H04W 74/006 370/322 |
| 8,687,608 B2 | 4/2014 | Soliman | |

(Continued)

FOREIGN PATENT DOCUMENTS

WO    0042726 A1    7/2000

OTHER PUBLICATIONS

Diaz-Anadon M.O., et al., "TDMA scheduling for event-triggered data aggregation in irregular wireless sensor networks," Computer Communications, 2011, vol. 34, pp. 2072-2081.

(Continued)

*Primary Examiner* — Man Phan
(74) *Attorney, Agent, or Firm* — Arent Fox

(57) ABSTRACT

In an aspect of the disclosure, a method, a computer program product, and an apparatus are provided. The apparatus may be a first node. The first node determines a data frame based on synchronization information. The data frame has a signaling block and a plurality of data slots. The signaling block is prior to the plurality of data slots. The first node communicates with a second node in the signaling block to reserve a first data slot of the plurality of data slots during which to transmit or to receive a first packet. The first node transmits the first packet to the second node or receives the first packet from the second node during the first data slot.

30 Claims, 14 Drawing Sheets

(56) References Cited

U.S. PATENT DOCUMENTS

| | | | |
|---|---|---|---|
| 9,179,455 B2* | 11/2015 | Park | H04W 72/02 |
| 2003/0012176 A1* | 1/2003 | Kondylis | H04W 28/16 |
| | | | 370/348 |
| 2007/0230423 A1* | 10/2007 | Yoshida | H04W 76/02 |
| | | | 370/338 |
| 2009/0168744 A1 | 7/2009 | Park | |
| 2011/0085522 A1* | 4/2011 | Park | H04W 74/02 |
| | | | 370/336 |
| 2014/0098724 A1 | 4/2014 | Park | |
| 2016/0112943 A1* | 4/2016 | Horn | H04W 8/065 |
| | | | 370/329 |
| 2016/0112992 A1* | 4/2016 | Bhushan | H04L 5/0042 |
| | | | 370/330 |
| 2016/0204951 A1* | 7/2016 | Walton | H04L 12/1475 |
| | | | 370/259 |

OTHER PUBLICATIONS

Gilani M.H.S., et al., "An adaptive CSMA/TDMA hybrid MAC for energy and throughput improvement of wireless sensor networks," Ad Hoc Networks, 2013, vol. 11, pp. 1297-1304.

Valera A.C., et al., "Survey on wakeup scheduling for environmentally-powered wireless sensor networks," Computer Communications, 2014, vol. 52, pp. 21-36.

International Search Report and Written Opinion—PCT/US2016/022337—ISA/EPO—Jun. 10, 2016.

\* cited by examiner

IOE DEVICE TRANSMISSION SIGNALING AND SCHEDULING

BACKGROUND

Field

The present disclosure relates generally to communication systems, and more particularly, to techniques of transmission signaling and scheduling of internet-of-everything (IoE) devices in wireless IoE networks.

Background

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a wireless IoE network, typically, most IoE devices will be in a power-saving mode (i.e., the sleep mode) most of the time to conserve power. When an IoE device sleeps, the IoE device operates in a power-saving mode. Particularly, the transmitter and the receiver of the IoE device may be disabled (e.g., turned off) and may not be able to transmit or receive signals. In order to communicate, however, a transmitting IoE device can only transmit when the receiving IoE device is awake. When an IoE device is awake, the IoE device operates in a normal operation mode. Particularly, the transmitter and the receiver of the IoE device may be enabled (e.g., turned on) and may be able to transmit or receive signals.

This necessitates a mechanism for scheduling and signaling awake periods among IoE devices such that the IoE devices can discover and communicate with each other. Furthermore, in a multi-hop wireless IoE network, the awake scheduling of different devices on a route requires coordination in order to achieve low end-to-end latency.

The IoE devices in a wireless IoE network may have a traffic that requires best-effort, that is bursty and requires lower-latency, and/or that is periodic with widely-varying cycles. The IoE devices may have limited power, which necessitates that the IoE devices operate in a power-saving mode as often as possible.

Thus, there is a need for a mechanism for arranging transmission signaling and scheduling that allows the IoE devices to sleep most of the time when they are not directly transmitting or receiving and, at the same time, that facilitates achieving the desired latency for different types of traffic.

Further, there is a need for a mechanism that allows the IoE devices in a wireless IoE network to prioritize transmissions/receptions of messages among the IoE devices such that a particular IoE device can sleep most of the time when not directly transmitting and can access the shared medium with priority and continue to reserve a slot in each frame for a duration to meet the latency constraints and/or the desired periodicity of the traffic of the particular IoE device.

SUMMARY

In an aspect of the disclosure, a method, a computer program product, and an apparatus are provided. The apparatus may be a first node. The first node determines a data frame based on synchronization information. The data frame has a signaling block and a plurality of data slots. The signaling block is prior to the plurality of data slots. The first node communicates with a second node in the signaling block to reserve a first data slot of the plurality of data slots during which to transmit or to receive a first packet. The first node transmits the first packet to the second node or receives the first packet from the second node during the first data slot.

DETAILED DESCRIPTION

Figure 1:
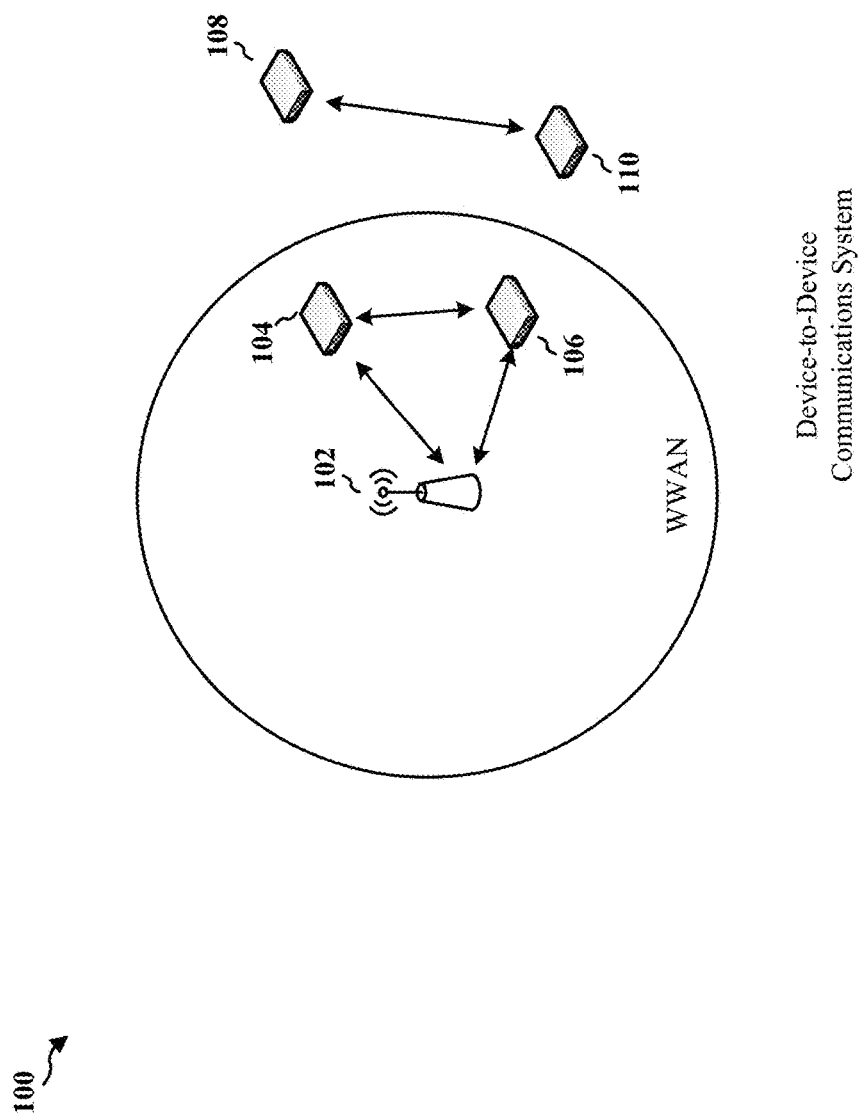
FIG. 1 is a diagram of a device-to-device communications system.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an Institute of Electrical and Electronics Engineers (IEEE) 802.11 protocol using orthogonal frequency-division multiplexing (OFDM), direct sequence spread spectrum (DSSS) communications, a combination of OFDM and DSSS communications, or other schemes. Implementations of the IEEE 802.11 protocol may be used for sensors, metering, and smart grid networks. Advantageously, aspects of certain devices implementing the IEEE 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatus may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed supra, certain devices described herein may implement the IEEE 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 is a diagram of a device-to-device communications system 100. The device-to-device communications system 100 includes a plurality of wireless devices 104, 106, 108, 110. The device-to-device communications system 100 may overlap with a cellular communications system, such as for example, a wireless wide area network (WWAN). Some of the wireless devices 104, 106, 108, 110 may communicate together in device-to-device communication using the DL/UL WWAN spectrum, some may communicate with the base station 102, and some may do both. For example, as shown in FIG. 1, the wireless devices 108, 110 are in device-to-device communication and the wireless devices 104, 106 are in device-to-device communication. The wireless devices 104, 106 are also communicating with the base station 102.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus may be discussed within the context of one or more systems. However, one of ordinary skill in the art would understand that the exemplary methods and apparatuses are applicable more generally to a variety of other wireless device-to-device communication systems.

Figure 2:
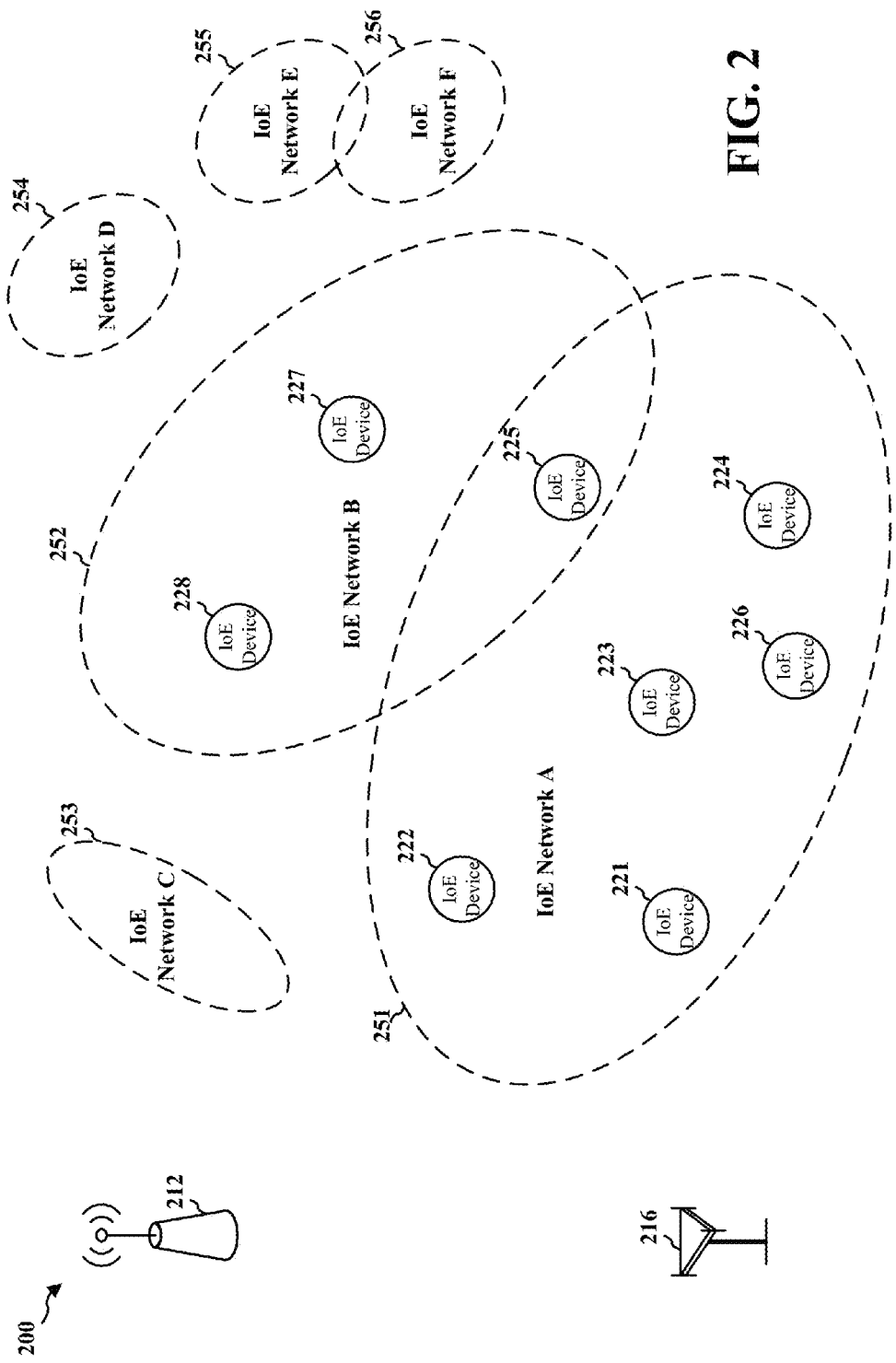
FIG. 2 is a diagram illustrating IoE devices in wireless IoE networks.

FIG. 2 is a diagram 200 illustrating IoE devices in wireless IoE networks. A wireless IoE network may be a network of physical objects or things embedded with electronics, software, sensors and connectivity to enable it to achieve greater value and service by exchanging data with the manufacturer, operator and/or other connected devices. Each thing (i.e., an IoE device) may be uniquely identifiable through its embedded computing system but is able to interoperate within the existing Internet infrastructure. A wireless IoE network may offer advanced connectivity of devices, systems, and services that goes beyond machine-to-machine communications (M2M) and covers a variety of protocols, domains, and applications. Things (i.e., IoE devices), in the wireless IoE network, can refer to a wide variety of devices such as heart monitoring implants, biochip transponders on farm animals, electric clams in coastal waters, automobiles with built-in sensors, or field operation devices that assist fire-fighters in search and rescue. These devices collect useful data with the help of various existing technologies and then autonomously flow the data between other devices. Examples include smart thermostat systems and washer/dryers that utilize WiFi for remote monitoring. In certain configurations, a wireless IoE network may employ a wireless ad hoc network structure. In certain configurations, a wireless IoE network may employ a wireless mesh network structure.

IoE devices 221-226 are in a wireless IoE network A 251. IoE devices 225, 227-228 are in a wireless IoE network B 252. The IoE device 225 is in both the wireless IoE network A 251 and the wireless IoE network B 252. Other IoE devices (not shown) may be in a wireless IoE network C 253, a wireless IoE network D 254, a wireless IoE network E 255, a wireless IoE network F 256. The wireless IoE network A 251 to the wireless IoE network F 256 may be in the transmission range of an eNB 212 connected to a WWAN and a gateway 216 connected to a traditional network (e.g., WLAN).

A WWAN may provide timing synchronization information to the wireless IoE networks A-F 251-256. For example, in certain configurations, the IoE devices of the wireless IoE network A 251 to the wireless IoE network F 256 each may establish a downlink with the eNB 212 and may receive synchronization signals, e.g., primary synchronization signals (PSS) and secondary synchronization signals (SSS), from the eNB 212.

In another configuration, the gateway 216 may establish a downlink with the eNB 212 and may receive synchronization signals, e.g., PSS and SSS, from the eNB 212. Then, based on the synchronization signals, the gateway 216 may broadcast synchronization information to the IoE devices of the wireless IoE network A 251 to the wireless IoE network F 256, for example, through beacons. The gateway 216 provides coverage to all of the IoE devices of the wireless IoE network A 251 to the wireless IoE network F 256. Thus, the IoE devices of the wireless IoE network A 251 to the wireless IoE network F 256 can use the synchronization signals to determine synchronization information.

Therefore, the IoE devices of the wireless IoE network A 251 to the wireless IoE network F 256 may receive the synchronization signals directly or indirectly from a WWAN and may determine a common time reference relying on the synchronization signals. Based on the common time reference, the IoE devices can determine the superframe structure and/or the frame structure described infra. As such, the IoE devices do not need to send additional synchronization signals among themselves in order to establish the common superframe structure and/or the frame structure described infra.

FIG. 3(A) is a diagram 300 illustrating resource allocation among wireless IoE networks. An $N^{th}$ superframe and an $(N+1)^{th}$ superframe are on a channel A 312. The $N^{th}$ superframe has frames 321, 322, 323, 324. The $(N+1)^{th}$ superframe has the same number of frames as the $N^{th}$ superframe and starts with a frame 325. A $J^{th}$ superframe and a $(J+1)^{th}$ superframe are on a channel B 314. The $J^{th}$ superframe has frames 331, 332. The $(J+1)^{th}$ superframe has the same number of frames as the $J^{th}$ superframe and starts with a frame 333.

Figure 3:
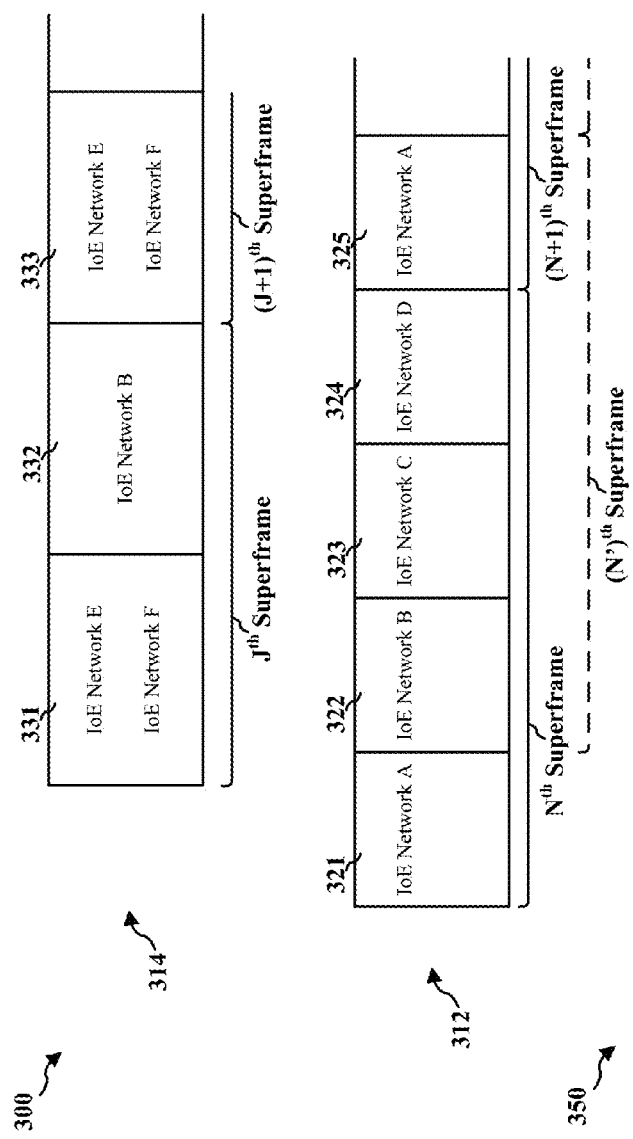
FIG. 3(A) is a diagram illustrating resource allocation among wireless IoE networks.
FIG. 3(B) illustrates a frame structure used in a wireless IoE network.

The IoE devices of the wireless IoE network A 251 to the wireless IoE network F 256 may require a low data transmission rate. Accordingly, each of the IoE devices of the wireless IoE network A 251 to the wireless IoE network F 256 may be configured to partition the available spectrum into multiple narrow-band frequency-division multiplexing (FDM) channels. Each channel may be shared in time by multiple wireless IoE networks through a superframe structure. FIG. 3 illustrates, as an example, that the channel A 312 is shared by 4 wireless IoE networks utilizing a superframe structure. In this example, the $N^{th}$ superframe has 4 frames: the frames 321, 322, 323, 324, which are allocated to the wireless IoE networks A-D 251, 252, 253, 254, respectively. Other superframes on the channel A 312 also have 4 frames similarly allocated to the wireless IoE networks A-D 251, 252, 253, 254.

Further, IoE devices in each wireless IoE network may decide the boundaries of the superframes based on the positions of the periodic frames allocated to that wireless IoE network. For example, the IoE devices in a wireless IoE network may decide that each superframe starts at a frame allocated to that wireless IoE network. Particularly, the IoE devices in the wireless IoE network B 252 may decide that the $(N')^{th}$ superframe starts at the frame 322, which is allocated to the wireless IoE network B 252, and include the frames 322, 323, 324, 325. In other words, the boundaries of the superframes may be shifted by IoE devices of different wireless IoE networks. Nonetheless, the length of the superframes may be fixed and determined by the periodicity of the frames allocated to a wireless IoE network. In the example illustrated in FIG. 3, each superframe on the channel A 312 has 4 frames.

Similarly, the channel B 314 is shared by 3 wireless IoE networks utilizing a superframe structure. In this example, the $J^{th}$ superframe on the channel B 314 has 2 frames: the frames 331, 332. The frame 331 is allocated to the wireless IoE network E 255 and the wireless IoE network F 256. That is, the wireless IoE network E 255 and the wireless IoE network F 256 share the frame 331 of the $J^{th}$ superframe on the channel B 314. In general, a single frame may be shared across multiple wireless IoE networks, depending on expected loading. The frame 332 is allocated to the wireless IoE network B 252. Other superframes on the channel B 314 also have 2 frames similarly allocated to the wireless IoE networks E/F 255/256 and the wireless IoE network 252. Further, the length of the $N^{th}$ superframe is larger than that of the $J^{th}$ superframe.

As described supra, the superframe structure supports allocating frames to wireless IoE networks with certain periodicity. For example, the wireless IoE network A 251 is allocated the first frame of the $N^{th}$ superframe on the channel A 312. That is, the wireless IoE network A 251 is allocated every fourth frame on the channel A 312. The periodicity of allocation may be determined based on the traffic requirement of the IoE devices in the wireless IoE network A 251. Similarly, the wireless IoE network B 252 is allocated the second frame of the $N^{th}$ superframe (or the first frame of $(N')^{th}$ superframe) on the channel A 312.

Different FDM channels may have different superframe structures, in terms of different frame lengths and different periodicity. For example, the superframes on the channel B 314 have a larger frame length and a smaller cycle than the superframes on the channel A 312. Further, a single wireless IoE network can be allocated frames on multiple channels to support different types of traffic. For example, the wireless IoE network B 252 is allocated the frame 322 of the $N^{th}$ superframe on the channel A 312 and the frame 332 of the $J^{th}$ superframe on the channel B 314.

Further, from the perspective of the IoE devices of a particular wireless IoE network, the IoE devices can derive a common frame structure based on the superframe structure that the particular wireless IoE network utilizes. The IoE devices may consider the length of the superframe as a superframe period, of which the frame allocated to the particular wireless IoE network defines an active period, while the frames not allocated to the particular wireless IoE network define an inactive period.

FIG. 3(B) illustrates a frame structure 350 from the perspective of the IoE devices of the wireless IoE network A 251. The period of the frame 321 is an active period N in the $N^{th}$ superframe period; the period of the frame 322, the frame 323, and the frame 324 is an inactive period of the $N^{th}$ superframe period. The period of the frame 325 is an active period N+1 in the $(N+1)^{th}$ superframe period.

The common network frame structure thus derived can then be utilized to independently schedule transmissions and sleep cycles for IoE devices in the particular wireless IoE network to meet latency requirements of different types of traffic. As such, the IoE devices may be in power-saving mode during most of the time when the IoE devices are not directly required to transmit or receive signals.

Figure 4:
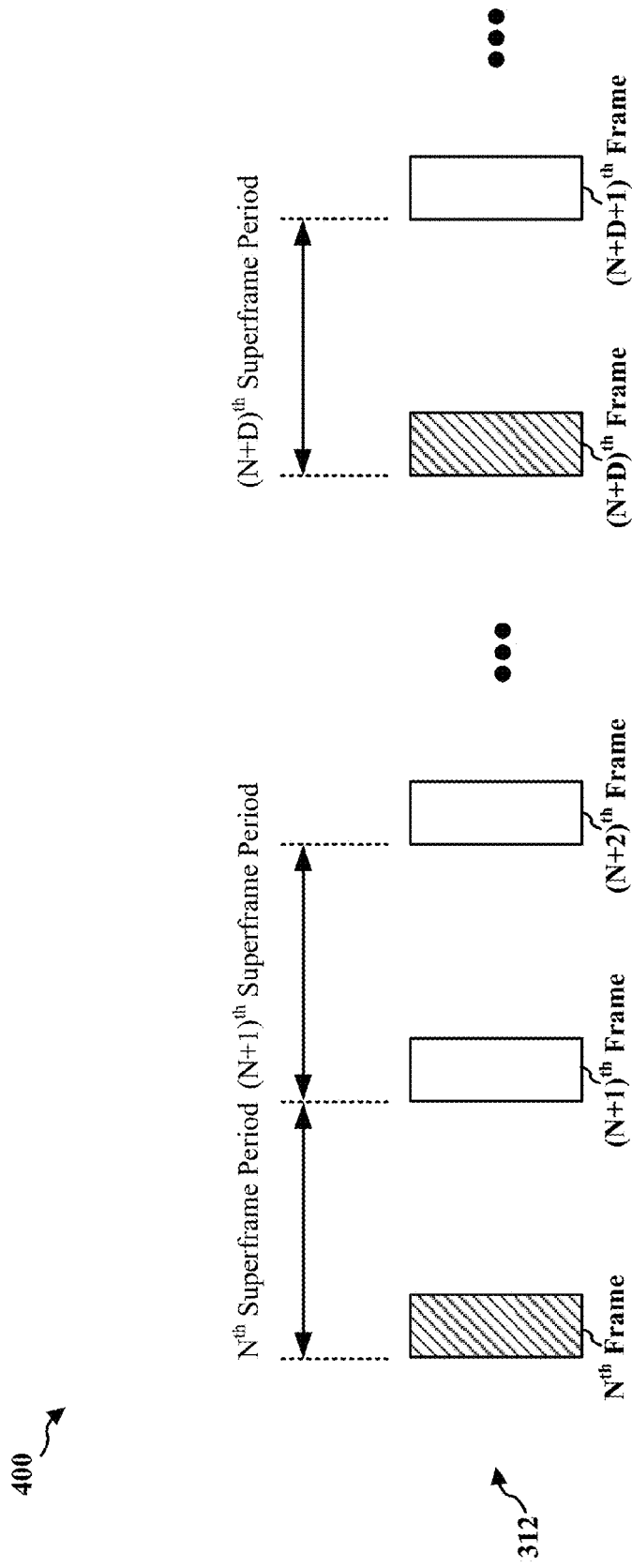
FIG. 4 is a diagram illustrating frames of a wireless IoE network.

FIG. 4 is a diagram 400 illustrating frames of a wireless IoE network.) Specifically, FIG. 4 illustrates $N^{th}$ to $(N+D+1)^{th}$ frames of $N^{th}$ to $(N+D+1)^{th}$ superframe periods are on the channel A 312. The IoE devices in a particular wireless IoE network are configured to determine frames in a superframe (or an active period in a superframe period) allocated to that particular wireless IoE network. As described supra referring to FIG. 0b, the IoE devices in the wireless IoE network A 251 are allocated periodic frames on the channel A 312. Specifically, the IoE devices in the wireless IoE network A 251 may determine, from their perspective and based on the synchronization signals from the eNB 212, the $N^{th}$ frame in the $N^{th}$ superframe period, the $(N+1)^{th}$ frame in the $(N+1)^{th}$ superframe period, etc.

In certain configurations, a superframe period may be short in order to maintain synchronization as well as to support lower-latency traffic in the wireless IoE network A 251. However, in many applications of IoE devices, an IoE device needs to be active for a short duration over much larger time scale. For example, the IoE device may need to be awake for a few superframe periods every a few minutes, hours, days, . . . and sleeps in the rest of the time to conserve power. Further, in order for an IoE device to transmit signals successfully to a receiving IoE device, the receiving IoE device needs to be awake during the transmission time.

In certain configurations, selected frames may be utilized as discovery frames by the IoE devices to broadcast scheduling data such as awake periods and sleep period as well as other information such as routing information and association information. These discovery frames may be periodic. FIG. 4 shows that in this example with respect to the wireless IoE network A 251 the discovery frames has a periodicity of D, where D is chosen to tradeoff discovery latency versus power. The IoE devices in the wireless IoE network A 251 may determine, based on the synchronization signals from the eNB 212, a start point of the frames transmitted on the channel A 312. Further, with the knowledge of the periodicity (i.e., D) of the discovery frames, the IoE devices may determine that the $N^{th}$ frame is a discovery frame and that the $(N+D)^{th}$ frame is a discovery frame.

In certain configurations, the IoE devices of the wireless IoE network A 251 may be configured to stay awake during each of the discovery frames. A particular IoE device may transmit its awake period schedule, network information, and association information to other IoE devices, e.g., through broadcasting, during each of the discovery frames. The awake period schedule indicates when the IoE device is awake and when the node is sleeping. The network information may include the network identifier (ID) (e.g., MAC address) of, routing information of, a network topology observed by, and trees and routes participated by the IoE device. The association information may include information that can be used by another IoE device to request association with the particular IoE device. When two IoE devices are associated with each other, they may be registered with each other, store each other's awake period schedule and network information, and function as each other's next hop node.

As such, a source IoE device looking to associate with a target IoE device can learn the awake period schedule and routing information of the target IoE device in the discovery frames. The source IoE device can then request association with the target IoE device and can configure the awake period of the source IoE device in accordance with the awake period of the target IoE device. Therefore, the source IoE device can stay awake to transmit data to and receive data from the target IoE device, and sleep during the rest of the time.

Figure 5:
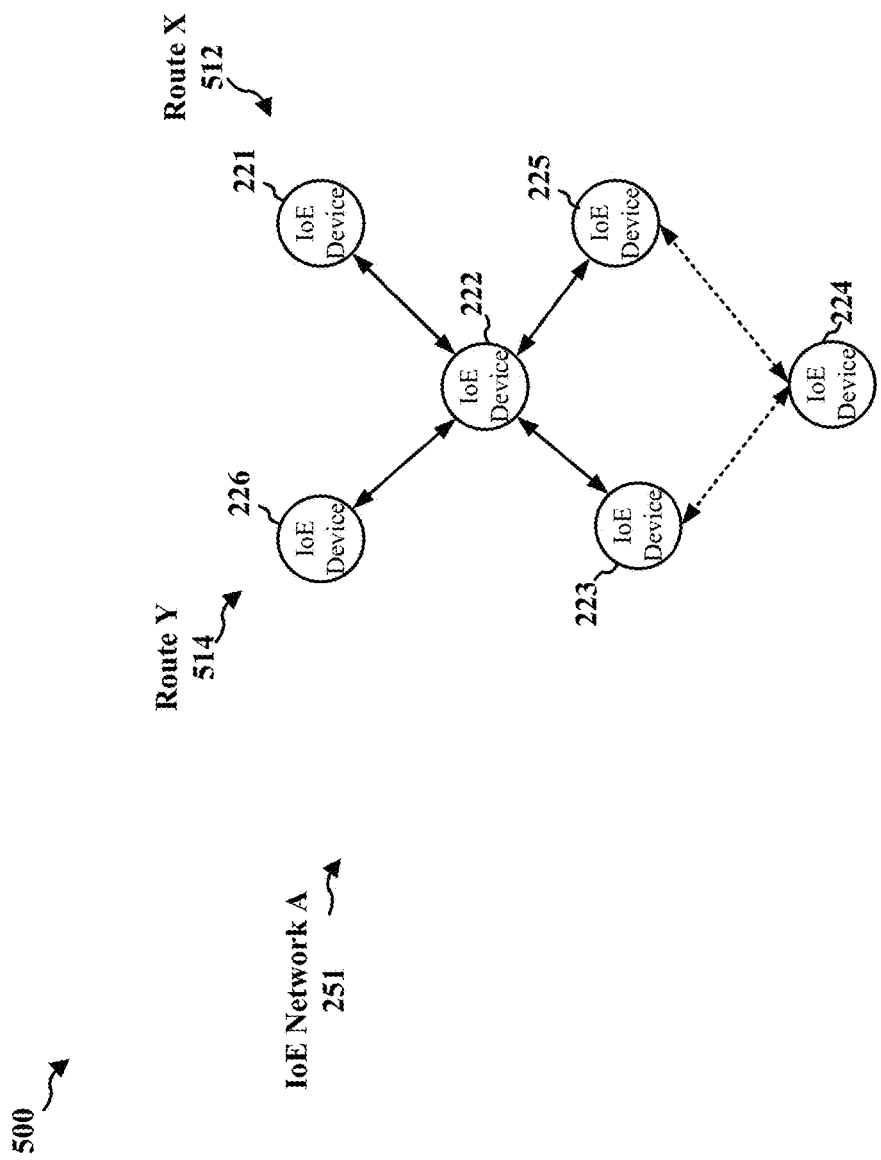
FIG. 5 is a diagram illustrating communication scheduling among IoE devices of a wireless IoE network.

FIG. 5 is a diagram 500 illustrating communication scheduling among IoE devices of a wireless IoE network. In this example, the wireless IoE network A 251 is a multi-hop wireless IoE network including the IoE devices 221-226. Further, a route X 512 includes the IoE device 221, the IoE device 222, the IoE device 223, and the IoE device 224. A route Y 514 that include the IoE device 226, the IoE device 222, and the IoE device 225. An IoE device (e.g., the IoE device 221) in the wireless IoE network A 251 may be configured to be awake (e.g., operate in a normal operation mode) according to an awake schedule, which specifies one or more awake periods, and to sleep (e.g., operate in a power-saving mode) during the rest of the time. The time period between two consecutive awake periods, during which the IoE device operates in a power-saving mode, may be referred to as a sleep period. Typically, the awake period of the IoE device is shorter than the sleep period. For example, the awake period may be less than 10%, 1%, 0.1%, or 0.01% of the sleep period.

If routes between source-destination pairs are not chosen carefully, different IoE devices on a route may be awake at different times, leading to large end-to-end latency. For example, suppose that each IoE device of the wireless IoE network A 251 has an awake period of L seconds and a sleep period of S seconds, where L<<S. Then on a route over H hops, where different IoE devices on the route have uncoordinated awake periods, the end-to-end delay can be as high as $\Theta(H \cdot S)$. $\Theta$ is an asymptotic notation. $f(n)=\Theta(g(n))$ means that there are positive constants $c_1$, $c_2$, and k, such that $0 \leq c_1 g(n) \leq f(n) \leq c_2 g(n)$ for all $n \geq k$. The values of $c_1$, $c_2$, and k must be fixed for the function $f$ and must not depend on n.

The techniques described infra may be used by the IoE devices 221-226 in a distributed manner to reduce the end-to-end delay. Each of the IoE devices 221-226 may be configured to determine its awake period schedule by itself based on information received from its next hop nodes. That is, the awake period schedule of each IoE device is not controlled or set by a central network management entity. Each of the IoE devices 221-226 may be configured to dynamically adjust its awake period schedule in order to coordinate with the awake period schedules of its next hop nodes based on operating and network conditions.

In certain configurations, the end-to-end delay may be reduced to about $\Theta(H \cdot L)$. For example, a source IoE device associating with a next hop node and making the source IoE device available to other IoE devices desiring to transmit data to the next hop node may configure the awake periods of the source IoE device in accordance with the awake periods of the next hop node.

Figure 6:
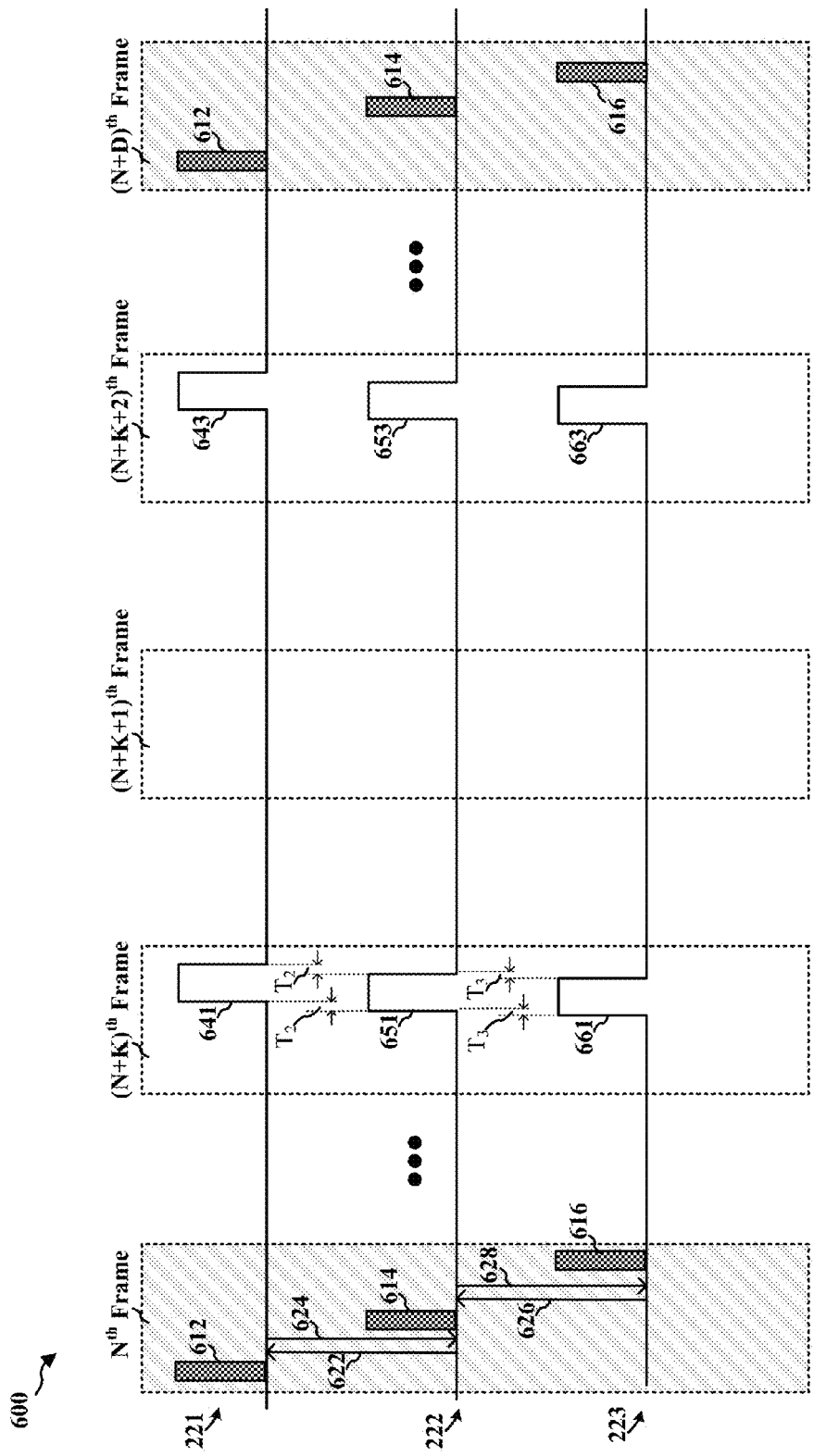
FIG. 6 is a diagram illustrating distributed and coordinated scheduling among IoE devices of a wireless IoE network.

FIG. 6 is a diagram 600 illustrating distributed and coordinated scheduling among IoE devices of a wireless IoE network. Particularly, FIG. 6 illustrates that the IoE device 221, the IoE device 222, and the IoE device 223 of the wireless IoE network A 251 are allocated frames (including $N^{th}$ to $(N+D)^{th}$ frames) on the channel A 312. The $N^{th}$ frame and the $(N+D)^{th}$ frame are discovery frames. The IoE device 221 may be awake according to an awake schedule. In this example, the IoE device 221 is scheduled to be awake in every other frames. Particularly, the IoE device 221 has the awake period 641 in the $(N+K)^{th}$ frame and the awake period 643 in the $(N+K+2)^{th}$ frame. The IoE device 221 broadcasts its device information 612—which includes its awake period schedule, network information, and association information—in the discovery frames (e.g., the $N^{th}$ frame and the $(N+D)^{th}$ frame).

The IoE device 222 may want to be associated with the IoE device 221. The IoE device 222 is awake during the discovery frames and may listen to the device information 612 broadcasted by the IoE device 221 in the $N^{th}$ frame (i.e., a discovery frame). Upon acquiring the device information 612, the IoE device 222 may send an association request 622 to the IoE device 221 in the $N^{th}$ frame, and the IoE device 221 may send an association response 624 in return. When the IoE device 221 accepts the association request 622 from the IoE device 222, the IoE device 222 may subsequently configure its awake periods according to the awake periods of the IoE device 221 to avoid high latency. The IoE device 222 may configure its awake periods to complete transmission or relay of data to the IoE device 221 before the awake periods of the IoE device 221 expires. Particularly, using the $(N+K)^{th}$ frame as an example, the IoE device 222 learns that the IoE device 222 has an awake period 641 in the $(N+K)^{th}$ frame. Accordingly, the IoE device 222 configures its awake period 651 to end a period $T_2$ prior to the end of the awake period 641. The period $T_2$ is the expected time for IoE device 222 to transmit or relay a configured amount of data to the IoE device 221. The configured amount of data may be the maximum amount of data that the IoE device 222 is configured to transmit to the IoE device 221. In certain configurations, the configured amount of data may be a packet.

The tail edge of the awake period 651 is at least the period $T_2$ before the tail edge of the awake period 641. This way, when the IoE device 222 receives data to be transmitted to the IoE device 221 in the awake period 651 of the IoE device 222, the IoE device 222 can complete the transmission of the data to the IoE device 221 in the awake period 651, because the awake period 651 is coordinated with the awake period 641 of the IoE device 221 such that the data can be completely received by the IoE device 221 in the awake period 641.

The IoE device 222 similarly configures its awake periods in other frames in which the IoE device 221 has awake periods. For example, the IoE device 222 similarly configures the awake period 653 based on the awake period 643 in the $(N+K+2)^{th}$ frame. Further, during the $N^{th}$ frame after the IoE device 222 has determined its awake periods based on the awake periods of the IoE device 221, the IoE device 222 may broadcast its device information 614—which may include its awake period schedule configured as such, its network information, and its association information—in discovery frames (e.g., the $N^{th}$ frame and the $(N+D)^{th}$ frame).

Further, the IoE device 222 may configure its awake period (e.g., the awake period 651) to start prior to, and within a period $T_2$ from, the start of the awake period (e.g., the awake period 641) of the IoE device 221. In other words, the front edge of the awake period 651 is within a period $T_2$ from the front edge of the awake period 641. This technique facilitates the transmission of data from the IoE device 222 to arrive at the IoE device 221 within the awake periods of the IoE device 221.

The IoE device 223 may want to associate with the IoE device 222. Using a process similar to the process described supra with respect the IoE device 222, the IoE device 223 listens to the device information 614 and then accordingly exchanges an association request 626 and an association response 628 with the IoE device 222 in the $N^{th}$ frame. Upon associating with the IoE device 222, the IoE device 223 configures its awake period to end a period $T_3$ prior to the end of the awake period of the IoE device 222. The period $T_3$ is the expected time for IoE device 223 to transmit a configured amount of data to the IoE device 222. For example, in the $(N+K)^{th}$ frame, the IoE device 223 configures an awake period 661 that ends the period $T_3$ prior to the end of the awake period 651. Further, the IoE device 223 may configure its awake period (e.g., the awake period 661) to start prior to, and within a period $T_3$ from, the start of the awake period (e.g., the awake period 651) of the IoE device 222. Subsequently, the IoE device 223 broadcasts its device information 614—which includes its awake period schedule configured and its association information—in discovery frames (e.g., the $N^{th}$ frame and the $(N+D)^{th}$ frame).

Referring back to FIG. 5, the techniques described supra may be utilized to facilitate data transmission from the IoE device 223 to the IoE device 222, and then to the IoE device 221, which may be referred to as an uplink direction. The IoE device 223, the IoE device 222, and the IoE device 221 may broadcast their awake periods determined as described supra as uplink awake periods.

Similarly, the IoE device 221, the IoE device 222, and the IoE device 223 may also utilize the techniques described supra to facilitate data transmission from the IoE device 221 to the IoE device 222, and then to the IoE device 223, which may be referred to as a downlink direction. The IoE device 221, the IoE device 222, and the IoE device 223 may similarly determine their downlink awake periods and broadcast their downlink awake periods.

The IoE device 225 may use similar techniques to associate with the IoE device 222 and to determine the awake periods of the IoE device 225 based on the awake periods of the IoE device 222. The IoE device 224 may use similar techniques to associate with the IoE device 223 and to determine the awake periods of the IoE device 224 based on the awake periods of the IoE device 223.

Further, a particular IoE device may be associated with multiple other IoE devices. In this example, the IoE device 222 is associated with the IoE device 221, IoE device 223, IoE device 225, and IoE device 226. Accordingly, the particular IoE device may determine its awake periods to suit the awake periods of all the associated IoE devices using the techniques described supra. In certain configurations, the IoE device 222 may aggregate the periodic awake periods determined in accordance with each of the IoE device 221, IoE device 223, IoE device 225, and IoE device 226. In other words, the IoE device 222 may configure a longer periodic awake period that includes the periodic awake periods determined in consideration of each of the IoE device 221, IoE device 223, IoE device 225, and IoE device 226.

In certain configurations, a particular IoE device may determine its next hop nodes for data transmission and then configure awake periods of the particular IoE device in accordance with the awake periods of the next hop nodes using the techniques described supra, thus allowing the particular IoE device to transmit to the next hop nodes in the awake periods of the next hop nodes. The IoE device may need to insert new awake periods when necessary. For example, referring to FIG. 5, the IoE device 222 may determine that the IoE device 221, the IoE device 223, the IoE device 225, and the IoE device 226 are neighboring nodes. To make such a determination, the IoE device 222 may listen to signaling messages transmitted from neighboring nodes in the discovery frames. The IoE device 222 may determine that its next hop nodes may be the IoE device 221, IoE device 223, IoE device 225, and IoE device 226. The IoE device 222 then listens to the awake period schedules of the IoE device 221, IoE device 223, IoE device 225, and IoE device 226 broadcasted in the discovery frames. Accordingly, the IoE device 222 may configure its awake periods based on the awake period schedules of the next hop nodes using the techniques described supra.

In certain configurations, the IoE devices in the wireless IoE network A 251 may implement multiple routes connecting various source and destination IoE devices. For example, the wireless IoE network A 251 may include the route X 512 that includes the IoE device 221, the IoE device 222, and the IoE device 223 as well as the route Y 514 that includes the IoE device 226, the IoE device 222, and the IoE device 225. The IoE devices on each route can determine their respective awake periods using the techniques described supra. An IoE device (e.g., the IoE device 222) on multiple routes can wake-up for each of the routes. The wake periods can be suitably aggregated to minimize the total wake time of the IoE device. The IoE device 224 may desire to transmit data on the route X 512 and/or the route Y 514 to a target destination node. The IoE device 224 may determine that the IoE device 223 and the IoE device 225 are neighboring nodes of the IoE device 224, and may select one of the IoE device 223 and the IoE device 225 as the next hop node of the IoE device 224. The IoE device 224 further may obtain the device information including the awake period schedule, the network information, and/or the association information of the selected next hop node in the discovery frames. The IoE device 224 may further adjust its awake periods based on the awake periods of the selected next hop node and request association with the selected next hop node. For example, in order to associate with the route X 512, the IoE device 224 may select the IoE device 223 and the next hop node.

Further, in certain configurations, in addition to determining awake periods based on the awake periods of the next hop nodes, a particular IoE device may communicate directly with another interested IoE device in the discovery frames, in which each of the IoE devices in the wireless IoE network A 251 may be configured to stay awake. Further, at least one of the particular IoE device and the interested IoE device may agree to stay awake for additional periods so as to reduce latency of ongoing communication.

Figure 7:
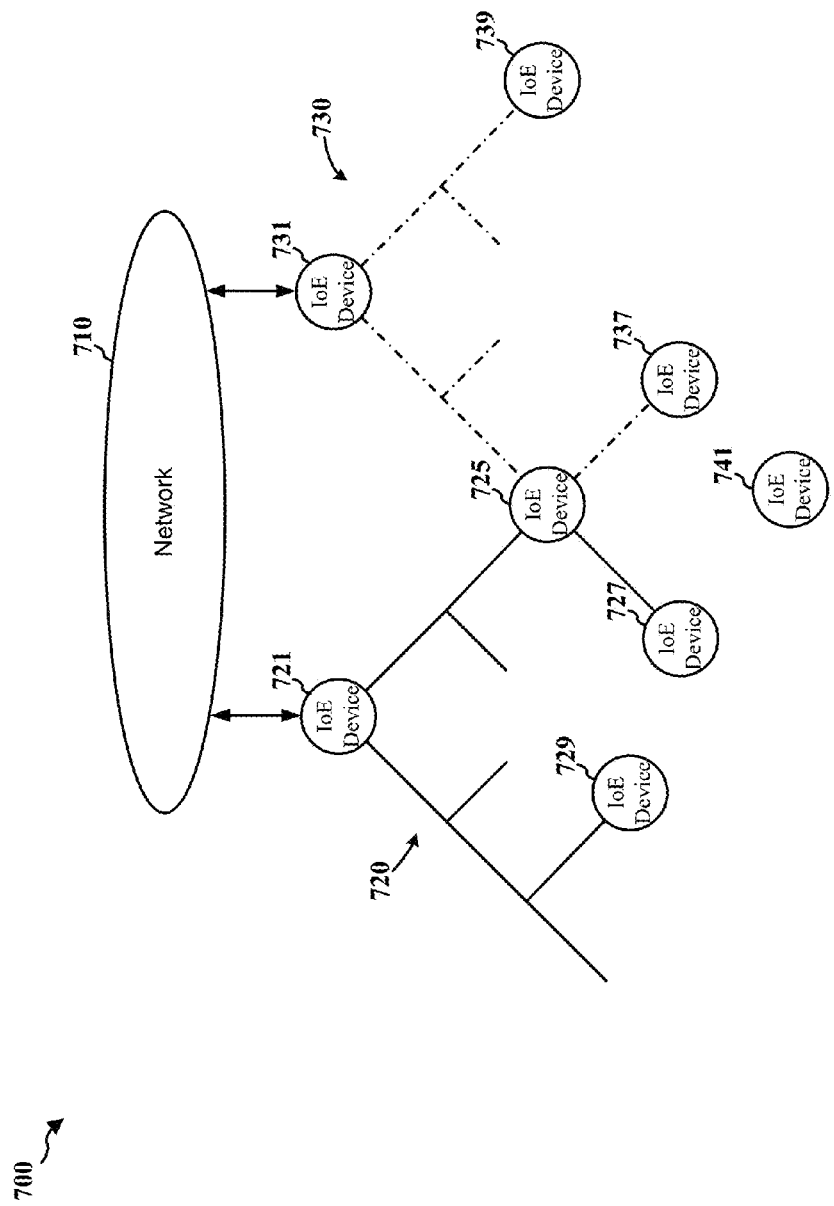
FIG. 7 is a diagram illustrating tree structures in a wireless IoE network.

FIG. 7 is a diagram 700 illustrating tree structures in a wireless IoE network. In this example, the IoE devices in the wireless IoE network C 253 may form multiple trees including a tree 720 and a tree 730. The tree 720 and the tree 730 are connected to a network 710. The tree 720 includes, among other IoE devices, an IoE device 721, an IoE device 725, an IoE device 727, and an IoE device 729. The tree 730 includes, among other IoE devices, an IoE device 731, the IoE device 725, an IoE device 737, and an IoE device 739. The IoE device 725 is on both trees. An IoE device 741 is adjacent to the tree 720 and the tree 730.

The tree 720 has a root node, which is the IoE device 721. The tree 730 has a root node, which is the IoE device 731. The root nodes of these trees are chosen among popular destinations, e.g., gateways. In this example, the IoE device 721 and the IoE device 731 are gateways connected to the network 710. Further, less power-constrained nodes can be on multiple trees. For example, the IoE device 725 is on both the tree 720 and the tree 730.

In certain configurations, the IoE devices on a tree may be configured to have the same awake periods, i.e., the awake periods of the tree. That is, each IoE device of a tree may be configured to stay awake and sleep at the same time periods. For a node that is on multiple trees, the node is configured to stay awake in the awake periods of each tree. As such, each IoE device stays awake during each of its trees awake periods, facilitating low latency for each of the paths passing through the IoE device.

Further, the IoE device 741 may wish to choose a tree from multiple trees in order to transmit data to the network 710. That is, the IoE device 741 may desire to select an IoE device on the tree 720 or the tree 730 as a next hop node of the IoE device 741. The IoE device 741 may choose a tree based on the awake periods of the trees. For example, the IoE device 741 may choose a tree whose awake periods are the closest to the ideal data transmission time in order to reduce latency. In this example, the IoE device 741 may need to periodically transmit data to the network 710. Thus, the IoE device 741 may choose one of the tree 720 and the tree 730 whose awake periods are closest to the periodic data transmission of the IoE device 741. That is, the IoE device 741 selects a tree such that the data can be transmitted with less delay to the network 710. The IoE device 741 may determine that the IoE device 727 and the IoE device 737 are neighboring nodes of the IoE device 741, and may select one of the IoE device 727 and the IoE device 737 as the next hop node of the IoE device 741 in accordance with the selected tree. The IoE device 741 further may obtain the device information including the awake period schedule, the network information, and/or the association information of the selected next hop node in the discovery frames. For example, in order to associate with the tree 720, the IoE device 741 may select the IoE device 727 and the next hop node. The IoE device 741 may further adjust its awake periods based on the awake periods of the selected next hop node and request association with the selected next hop node. These techniques allow better utilization of the channel capacity as different trees can be active at different times.

Figure 8:
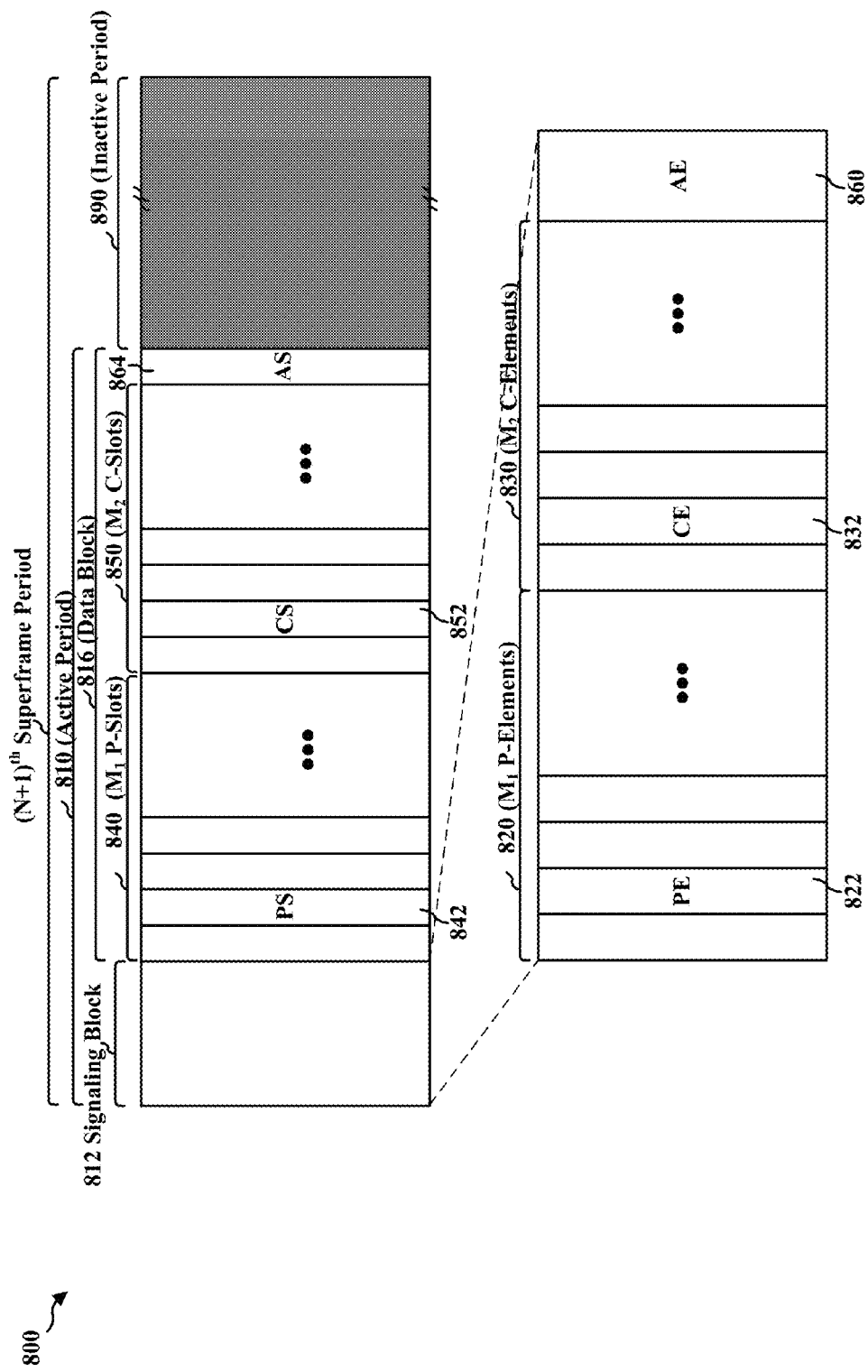
FIG. 8 is a diagram illustrating resource allocation in a wireless IoE network.

FIG. 8 is a diagram 800 illustrating resource allocation in a wireless IoE network. In certain configurations, an $(N+1)^{th}$ superframe period has an active period 810, i.e., an $(N+1)^{th}$ frame, and an inactive period 890. The $(N+1)^{th}$ frame has a signaling block 812 and a data block 816. The signaling block 812 has prioritized element periods 820, contention element periods 830, and optionally at least one association element period 860. The data block 816 has prioritized slots 840, contention slots 850, and optionally an association slot 864 (AS). A prioritized element period 822 (PE) corresponds to a prioritized slot 842 (PS), and a contention element period 832 (CE) corresponds to a contention slot 852 (CS).

As described supra, some of the IoE devices 221-226 in the wireless IoE network A 251 may be configured to stay awake in the active period 810 (i.e., the $(N+1)^{th}$ frame) of the $(N+1)^{th}$ superframe period. The active period 810 has the signaling block 812 and the data block 816. In certain configurations, the signaling block 812 has one or more element periods. The data block 816 has one or more data slots. The one or more element periods correspond to the one or more data slots. As described infra, each element period may be utilized by the IoE devices in the wireless IoE network A 251 to reserve a respective corresponding data slot. In certain configurations, the IoE devices in the wireless IoE network A 251 that desire to transmit signals in the data block 816 may obtain a data slot use a priority based mechanism and/or a contention based mechanism. The element periods may contain the prioritized element periods 820, and the data slots may contain the prioritized slots 840. The prioritized element periods 820 and the prioritized slots 840 are utilized by the priority based mechanism. Further, the element periods may contain the contention element periods 830, and the data slots may contain the contention slots 850. The contention element periods 830 and the contention slots 850 are utilized by the contention based mechanism.

Each of the IoE devices may be configured to determine the structure of an active period in a superframe period. For example, an IoE device may be configured with knowledge of the length of the signaling block 812 and the length of the data block 816. An IoE device may also be configured with knowledge of the number of the element periods in the signaling block 812 and the length of the each element period. An IoE device may also be configured with knowledge of the number of the data slots in the data block 816 and the length of each data slot. The IoE device can assign an index number to each element period and each data slot. The corresponding element period and data slot may be assigned the same index number. As such, each of the IoE devices 221-226 can, for example, use the synchronization signals from the eNB 212 to determine a time reference and subsequently determine each pair of corresponding element period and data slot based on the knowledge regarding the element periods and data slots aforementioned.

In this example, the data block 816 may contain $M_0$ data slots that include $M_1$ prioritized slots (P-Slots) and $M_2$ contention slots (C-Slots). Accordingly, the signaling block 812 contains $M_0$ element periods that include $M_1$ prioritized element periods (P-Elements) and $M_2$ contention element periods (C-Elements). That is, each element period of the $M_1$ prioritized element periods corresponds to a respective data slot of the $M_1$ prioritized slots. Each element period of the $M_2$ contention element periods corresponds to a respective data slot of the $M_2$ contention slots. The $M_1$ prioritized slots and the $M_2$ contention slots may be arranged in any suitable order, as long as the IoE devices are configured to determine the arrangement of the data slots. Similarly, the $M_1$ prioritized element periods and the $M_2$ contention element periods may be arranged in any suitable order, as long as the IoE devices are configured to determine the arrangement of the element periods and the corresponding data slot of each element period.

In the example illustrated in FIG. 8, the $M_1$ prioritized slots are allocated at the beginning portion of the data block 816 (i.e., the prioritized slots 840), and the $M_2$ contention slots are allocated in the portion following the prioritized slots (i.e., the contention slots 850). Similarly, the $M_1$ prioritized element periods are allocated at the beginning portion of the signaling block 812 (i.e., the prioritized element periods 820), and the $M_2$ contention element periods are allocated in the portion following the prioritized element periods (i.e., the contention element periods 830). Particularly, the prioritized element period 822 corresponds to the prioritized slot 842, and the contention element period 832 corresponds to contention slot 852. For example, based on the type, category, or content of a packet (data) to be transmitted, an IoE device can determine whether the packet is priority based traffic. In one scenario, the IoE device may want to transmit a packet that includes an alert message. The IoE device may determine that such a packet is priority based traffic. Accordingly, the IoE device may use the prioritized element periods and prioritized slots. In another scenario, the node may want to transmit a packet that includes a routine status report. The IoE device may determine that such a packet is not priority based traffic, but is contention based traffic. Accordingly, the IoE device may use the contention element periods and contention slots.

More particularly, as an example, the IoE device 221 may communicate reservation messages (e.g., RTS/CTS) with the IoE device 222 in the prioritized element period 822 of a frame to reserve the prioritized slot 842 of the frame to transmit a first packet of priority based traffic. When the IoE device 222 receives an RTS transmitted from the IoE device 221 in the prioritized element period 822, the IoE device 222 can determine that the prioritized element period 822 is a prioritized element period and corresponds to the prioritized slot 842. The IoE device 222 may transmit a CTS to the IoE device 221 in response in the prioritized element period 822. Through the exchange of RTS/CTS, the IoE device 221 and the IoE device 222 communicated and confirmed that the IoE device 221 may transmit one or more packets (data) to the IoE device 222 in the prioritized slot 842. The IoE device 221 remains awake in the prioritized slot 842 to transmit the one or more packets to the IoE device 222. The IoE device 222 remains awake in the prioritized slot 842 to receive the one or more packets from the IoE device 222.

The IoE device 223 may communicate reservation messages (e.g., RTS/CTS) with the IoE device 224 in the contention element period 832 of the frame to reserve the contention slot 852 of the frame to transmit a second packet of contention based traffic. When the IoE device 224 receives an RTS transmitted from the IoE device 223 in the contention element period 832, the IoE device 224 can determine that the contention element period 832 is a contention element period and corresponds to the contention slot 852. The IoE device 224 may transmit a CTS to the IoE device 223 in response in the contention element period 832. Through the exchange of RTS/CTS, the IoE device 223 and the IoE device 224 communicated and confirmed that the IoE device 223 may transmit one or more packets (data) to the IoE device 224 in the contention slot 852. The IoE device 223 remains awake in the contention slot 852 to transmit the one or more packets to the IoE device 224. The IoE device 224 remains awake in the contention slot 852 to receive the one or more packets from the IoE device 224.

Subsequently, the IoE device 221 may transmit the first packet to the IoE device 222 in the prioritized slot 842 of the frame. When there is no other data transmission at the IoE device 221 and the IoE device 222, the IoE device 221 and the IoE device 222 can sleep during the data slots of the data block 816 other than the prioritized slot 842. The IoE device 223 may transmit the second packet to the IoE device 224 in the contention slot 852 of the frame. When there is no other data transmission at the IoE device 223 and the IoE device 224, the IoE device 223 and the IoE device 224 can sleep during the data slots of the data block 816 other than the contention slot 852.

The $(N+1)^{th}$ frame may be configured to include more than one signaling blocks and more than one data blocks. Each signaling block is allocated prior to a corresponding data block and is used to handle signaling for reserving data slots of the corresponding data block. For example, the $(N+1)^{th}$ frame may be configured to have a first signaling block at the beginning of the $(N+1)^{th}$ frame followed by a corresponding first data block of the first signaling block as well as a second signaling block at the middle of the $(N+1)^{th}$ frame followed by a corresponding second data block of the second signaling block.

As described supra, the contention slots are used by a contention-based mechanism that may be configured at each of the IoE devices of the wireless IoE network A 251. The contending IoE devices perform carrier sense multiple access with collision avoidance (CSMA/CA), for example, through RTS-CTS handshake, exponential backoff, or FlashLinQ tones. In certain configurations, all the signaling for contending for the contention slots of the $(N+1)^{th}$ frame are initiated in the signaling block 812 (e.g., at the beginning of the (N+1) frame) in the corresponding contention element periods 830. Accordingly, an IoE device desiring to communicate data in the contention slots 850 of the $(N+1)^{th}$ frame can initially stay awake during the signaling block 812 to contend for a contention slot in the corresponding element period of the contention slot. After the signaling block 812, the IoE device can go into a power-saving mode (i.e., sleep) until the time period of a successfully acquired contention slot. If the IoE device has not successfully acquired any contention slot, the IoE device may sleep through the entire data block 816. As such, an IoE device may be able to sleep during most of the $(N+1)^{th}$ frame (i.e., active period 810), and be awake only during signaling block 812 and the contention slots during which the IoE device is actually transmitting or receiving data.

Further, because the size (length) of a contention element period may be fixed, when the contention among the IoE devices for a particular contention slot is not resolved within the contention element period corresponding to that contention slot, the contention may be continued in that contention slot itself. In this example, the IoE devices 221-226 may contend for the contention slot 852 in the contention element period 832. The IoE devices 221-226 may establish a contention window within the contention element period 832. If the length of the contention window is greater than the contention element period 832, a portion of the contention window may be allocated in the contention element period 832 and the rest portion of the contention window may be allocated in the contention slot 852 (e.g., at the beginning of the contention slot 852). The remaining of the contention slot 852 is used by a pair of transmitting-receiving IoE devices that have successfully acquired the contention slot 852 to communicate data.

In addition, to allow an IoE device to associate with another IoE device, one or more of the contention slots 850 can be designated for association and referred to as association element periods. That is, the IoE devices can use the association element periods to communicate association messages. In this example, the signaling block 812 contains the association element period 860 that is the last element period in the signaling block 812.

In certain configurations, a particular IoE device may want to associate with a particular wireless IoE network (i.e., any capable connected device in the wireless IoE network). For example, the IoE device 226, before joining the wireless IoE network A 251, may desire to associate with the wireless IoE network A 251 by associating with any of the IoE devices 221-225. The IoE device 226 can listen for messages transmitted by the IoE devices of the wireless IoE network A 251 (i.e., the IoE devices 221-225) in the prioritized element periods 820 and the contention element periods 830. The messages contain identity information, network information, and other information that can be used by the IoE device 226 to send an association request. Upon obtaining information of a target IoE device (e.g., the IoE device 225), the IoE device 226 can send an association request to the target IoE device in one of the association element periods (e.g., the association element period 860).

Further, a particular IoE device may want to associate with another IoE device. For example, the IoE device 222 may desire to associate with the IoE device 221. The IoE device 222 can listen for messages transmitted by the IoE device 221 in the prioritized element periods 820 and the contention element periods 830 to determine whether the IoE device 221 is awake in signaling block 812. The messages may also contain identity information, network information, and/or other information that can be used by the IoE device 222 to send an association request. Upon detecting the IoE device 221 in the signaling block 812 (and optionally obtaining additional information of the IoE device 221), the IoE device 222 can send an association request to the IoE device 221 in one of the association element periods (e.g., the association element period 860).

Further, in certain configurations, a particular IoE device (e.g., the IoE device 222) may utilize the association slot 864 in the data block 816 to exchange association information with another IoE device (e.g., the IoE device 221). For example, the association element period 860 may not have sufficient resources for conducting certain type of association information exchange (e.g., tone-based signaling in FlashLinQ). A data slot may be configured to occupy a longer time period than an element period and to provide more resources. Thus, the association slot 864 may provide sufficient resources for conducting association information exchange such as tone-based signaling in FlashLinQ.

In addition, a particular IoE device (e.g., the IoE device 222) can wait for the discovery frame (as described referring to FIG. 4 supra) during which another IoE device (e.g., the IoE device 221) is expected to be awake, and request association with the another IoE device in the discovery frame.

Figure 9:
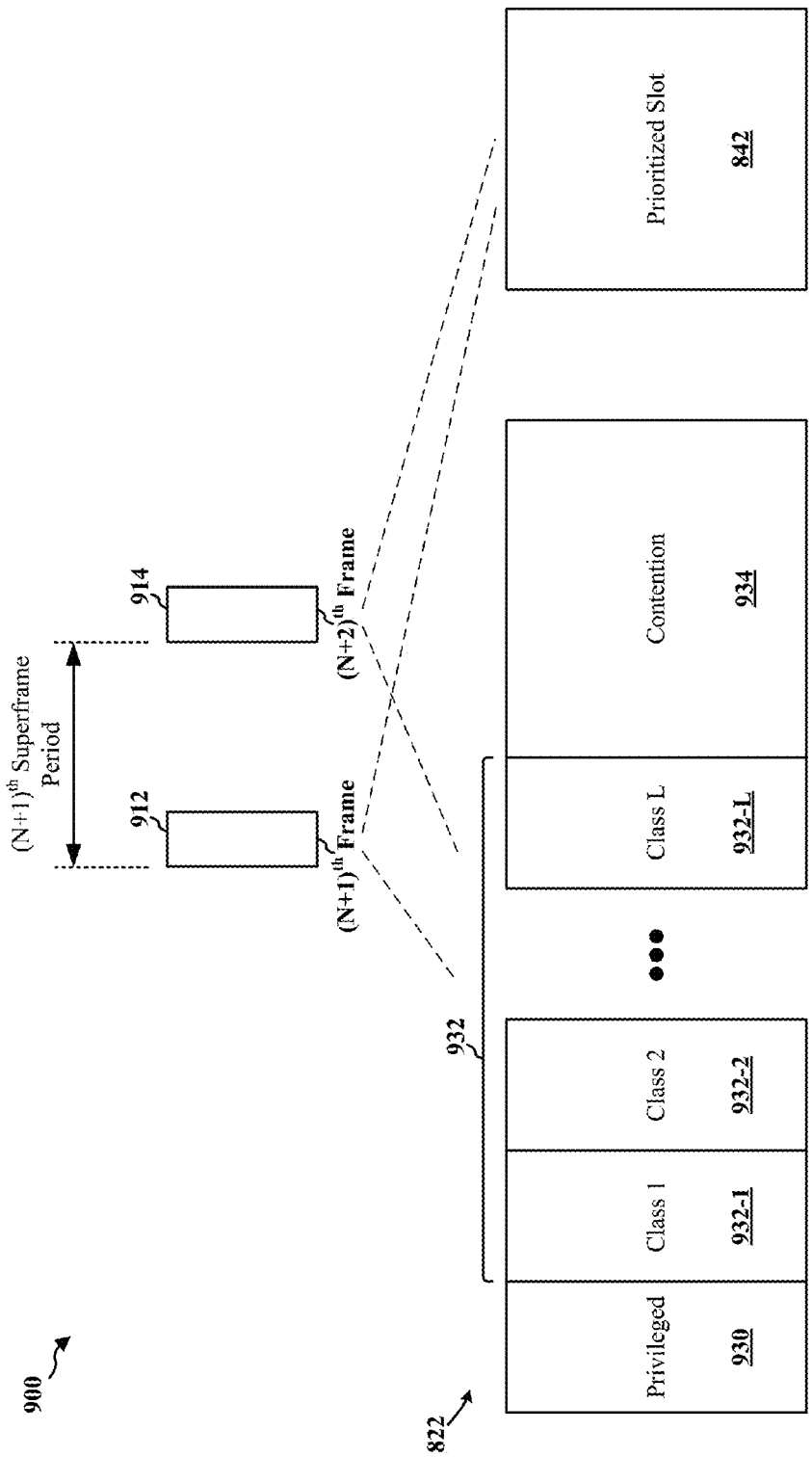
FIG. 9 is another diagram illustrating resource allocation in a wireless IoE network.

FIG. 9 is another diagram 900 illustrating resource allocation in a wireless IoE network. An $(N+1)^{th}$ frame 912 and an $(N+2)^{th}$ frame 914 may be utilized by some of the IoE devices in the wireless IoE network A 251. The $(N+1)^{th}$ frame 912 and the $(N+2)^{th}$ frame 914 each include the prioritized element period 822 and the corresponding prioritized slot 842 described supra referring to FIG. 8. A prioritized element period may have multiple resource periods. In certain configurations, the prioritized element period 822 has a privileged resource period 930, class resource periods 932 (including a class 1 resource period 932-1, a class 2 resource period 932-2, . . . , a class L resource period 932-L), and a priority contention resource period 934.

As stated, the prioritized element period 822 corresponds to the prioritized slot 842 of the $(N+1)^{th}$ frame 912, which is allocated to the wireless IoE network A 251. The IoE devices of the wireless IoE network A 251 may be configured into different priority classes. Each class of IoE devices is configured to use a corresponding resource period to acquire the prioritized slot 842. For example, in one scenario, the IoE device 223 may want to send an alert message and, thus, may belong to the priority class 1. Accordingly, the IoE device 223 may use the class 1 resource period 932-1 to acquire the prioritized slot 842. In another scenario, the IoE device 223 may want to send a measured temperature and, thus, may belong to the priority class 2. Accordingly, the IoE device 223 may use the class 2 resource period 932-2 to acquire the prioritized slot 842. As described infra in more detail, when the IoE device 223 did not acquire the same slot in the immediate prior data frame (i.e., the data frame, which is not a discovery frame, that is prior and consecutive to the current data frame), the IoE device 223 does not have a privilege over the prioritized slot 842 of the $(N+1)^{th}$ frame 912 and may not use the privileged resource period 930.

In this example, in the $(N+1)^{th}$ frame 912, the IoE device 223 determines that it did not acquire the prioritized slot 842 in an immediate prior data frame (e.g., the $N^{th}$ frame when the $N^{th}$ frame is not a discovery frame or the $(N-1)^{th}$ frame when the $N^{th}$ frame is a discovery frame) and, accordingly, detects whether any reservation messages are communicated by other IoE devices in the resource periods that are prior to the class 2 resource period 932-2 (i.e., the privileged resource period 930 and the class 1 resource period 932-1).

When the IoE device 223 detects reservation messages in the privileged resource period 930 and class 1 resource period 932-1, the IoE device 223 can determine that another IoE device having a privilege or a priority higher than the IoE device 223 desires to use the prioritized slot 842. Accordingly, the IoE device 223 will not communicate reservation messages in the class 2 resource period 932-2 and will not communicate data in the prioritized slot 842.

When the IoE device 223 detects no reservation messages in the privileged resource period 930 and the class 1 resource period 932-1, the IoE device 223 can determine that no IoE devices having a privilege or a priority higher than the IoE device 223 desire to use the prioritized slot 842. Accordingly, the IoE device 223 may communicate reservation messages with a desired IoE device (e.g., the IoE device 224) in the class 2 resource period 932-2 to acquire the prioritized slot 842. For example, the reservation messages may be RTS/CTS messages or FlashLinQ tones. When there is no conflicts with other IoE devices of the same class within the class 2 resource period 932-2 (e.g., the other IoE devices may also transmit reservation messages in the class 2 resource period 932-2) and, optionally, the IoE device 223 receives a confirmation from the IoE device 224, the IoE device 223 may determine that it has successfully acquired the prioritized slot 842 and subsequently communicate data with the IoE device 224 in the prioritized slot 842. Particularly, the IoE device 223 may send an RTS message to the IoE device 224, and the IoE device 224, in response, may transmit a CTS message to the IoE device 223. That is, the IoE device 223 may send an RTS to the IoE device 224 in the class 2 resource period 932-2. The IoE device 223 may receive a CTS from the IoE device 224 in the class 2 resource period 932-2. Subsequently, the IoE device 223 may transmit data to the IoE device 224 in the prioritized slot 842.

In certain configurations, when a particular IoE device transmitted data in a selected prioritized slot in a particular frame, the particular IoE device have privilege to the same prioritized slot in the next frame. In other words, the particular IoE device is given the first priority and opportunity to acquire the same prioritized slot in the next frame. Specifically, the IoE device having a privilege to the selected prioritized slot may send reservation messages in the privileged resource period of the element period designated to the selected prioritized slot. In this example, the IoE device 223 may desire to continue transmitting data in a data frame (i.e., the $(N+2)^{th}$ frame 914) that is consecutive and subsequent to the data frame (i.e., the $(N+1)^{th}$ frame 912) in which the IoE device 223 transmitted data. That is, because the IoE device 223 acquired the prioritized slot 842 of the $(N+1)^{th}$ frame 912, the IoE device 223 has a privilege to the prioritized slot 842 of the $(N+2)^{th}$ frame 914. The IoE device 223 may communicate reservation messages with the IoE device 224 in the privileged resource period 930 to acquire the prioritized slot 842.

The privileged resource period 930 is prior to all the other resource periods in the prioritized element period 822. Therefore, the other IoE devices in the wireless IoE network A 251 will detect the reservation messages transmitted from the IoE device 223 prior to attempting to send any reservation messages. Upon detecting the reservation messages from the IoE device 223, the other IoE devices may determine that the prioritized slot 842 is acquired by the IoE device 223 and, accordingly, will not transmit any reservation messages in the prioritized element period 822 and will not transmit data in the prioritized slot 842. The IoE device 223 may send an RTS to the IoE device 224 in the privileged resource period 930. The IoE device 223 may receive a CTS from the IoE device 224 in the privileged resource period 930. Subsequently, the IoE device 223 may transmit data to the IoE device 224 in the prioritized slot 842.

In certain configurations, an IoE device (e.g., the IoE device 225) that does not have any priority based traffic may detect whether any reservation messages are transmitted in the privileged resource period 930 and the class resource periods 932. When the IoE device detects no reservation messages in the privileged resource period 930 and the class resource periods 932, the IoE device can determine that no IoE devices having priority based traffic desire to use the prioritized slot 842. Accordingly, the IoE device may communicate reservation messages with a desired IoE device (e.g., the IoE device 226) in the priority contention resource period 934 to acquire the prioritized slot 842. For example, the reservation messages may be RTS/CTS messages or FlashLinQ tones. The IoE device 225 may send an RTS to the IoE device 226 in the priority contention resource period 934. The IoE device 225 may receive a CTS from the IoE device 226 in the priority contention resource period 934. Subsequently, the IoE device 225 may transmit data of non-priority based traffic (i.e., contention based traffic) to the IoE device 226 in the prioritized slot 842.

The technique described supra allocates resources on a share medium and provides a distributed mechanism for a pair of transmitting-receiving IoE devices to achieve prioritization and reservation of a prioritized slot in a periodic way for a duration. This technique allows a particular IoE device to reserve and continue accessing a prioritized slot for a certain periodic duration. In one aspect, the technique can be advantageously utilized by some IoE devices transmitting certain specific types of traffic expected in IoE networks, such as periodic and lower-latency bursty traffic.

Further, the technique may use a frame structure other than the frame structure having a signaling block and a data block described supra. The technique may use any frame structure that designates an element period to a prioritized slot. The element period has a privileged resource period that may be used by a particular pair of transmitting-receiving IoE devices that has priority to that prioritized slot and that accessed the prioritized slot in the previous frame. The element period has a priority class resource period that may be used by a pair of transmitting-receiving IoE devices in the corresponding priority class. The element period may also have a priority contention resource period. The use of the privileged resource period allows the particular pair of transmitting-receiving IoE devices to continue reserving and accessing the same prioritized slots of each frame in a sequence of frames for a duration. In certain configurations, a wireless IoE network may impose a maximum limit on the duration that may be reserved by a single pair of transmitting-receiving IoE devices. Discontinuation of privileged access to the prioritized slot in a subsequent frame is indicated by not sending reservation messages in the privileged resource period of the element period in the subsequent frame. This implicit indication, rather than an explicit signaling, may improve power efficiency (i.e., a crucial metric) of the IoE devices in the wireless IoE network.

When the previous privileged pair has released a particular prioritized slot, a new pair of transmitting-receiving IoE devices looking to get prioritized access to the particular prioritized slot, may detect the lack of activity during the privileged resource period in the element period designated to the particular prioritized slot. Accordingly, the new pair may get prioritized access to the particular prioritized slot by sending reservation messages or the handshake signaling in the priority class resource period. If two or more new pairs attempt to access at the same time (i.e., sending reservation messages in the priority class resource period), a contention resolution procedure, such as one based on the exponential backoff procedure, can be followed in the priority contention resource period. Furthermore, if there is no activity in either the privileged resource period or the priority class resource period, the prioritized slot can be made to fallback as a contention slot. Subsequently, a pair of transmitting-receiving IoE devices that is not in the priority classes of the prioritized slot can attempt to acquire the slot in the priority contention resource period.

The technique described supra can be used to facilitate periodic traffic between a pair of transmitting-receiving IoE devices. If the period of transmission is short (e.g., a few—such as 1, 3, or 5—frames between two adjacent transmissions), then the pair of transmitting-receiving IoE devices can reserve the same prioritized slot in each frame for the duration of the entire periodic transmission. In other words, the pair of transmitting-receiving IoE devices reserves the prioritized slot of the frames in between periodic transmissions but may not transmit any data in those reserved prioritized slots. On the other hand, if the period of transmission is long (e.g., a substantial number of—such as 100, 300, or 500—frames between two adjacent transmissions), the pair of transmitting-receiving IoE devices can contend a few (e.g., 1, 2, 3, or 5) frames in advance of each periodic transmission to acquire the prioritized slot in a prior data frame and then use the privilege to reserve the prioritized slot in each subsequent frames until the next periodic transmission is complete. Such mechanisms utilizing the techniques described supra may improve power-efficiency.

The technique described supra can be used to facilitate bursty traffic as well. A pair of transmitting-receiving IoE devices having bursty traffic can initially using reservation messages to content for a prioritized slot and then use the privilege to reserve a prioritized slot in each subsequent data frames for the duration of the burst. There may be some delay in the initial acquisition of the prioritized slot due to resolving priority. For example, multiple prioritized pairs of transmitting-receiving IoE devices may attempt to access the same prioritized slot. This may not be crucial in an IoE network, as usually latency requirements in such networks are not expected to be strict. Alternatively, a pair of transmitting-receiving IoE devices can attempt to acquire multiple prioritized slots in the initial frame through contention in multiple prioritized element periods. The pair of transmitting-receiving IoE devices can use any of the successfully acquired prioritized slots in the initial frame to initiate the transmission of the bursty traffic in order to reduce such latency. Subsequently, the pair of transmitting-receiving IoE devices can use the privilege to reserve the selected prioritized slot in each subsequent data frames for the duration of the burst.

Figure 10:
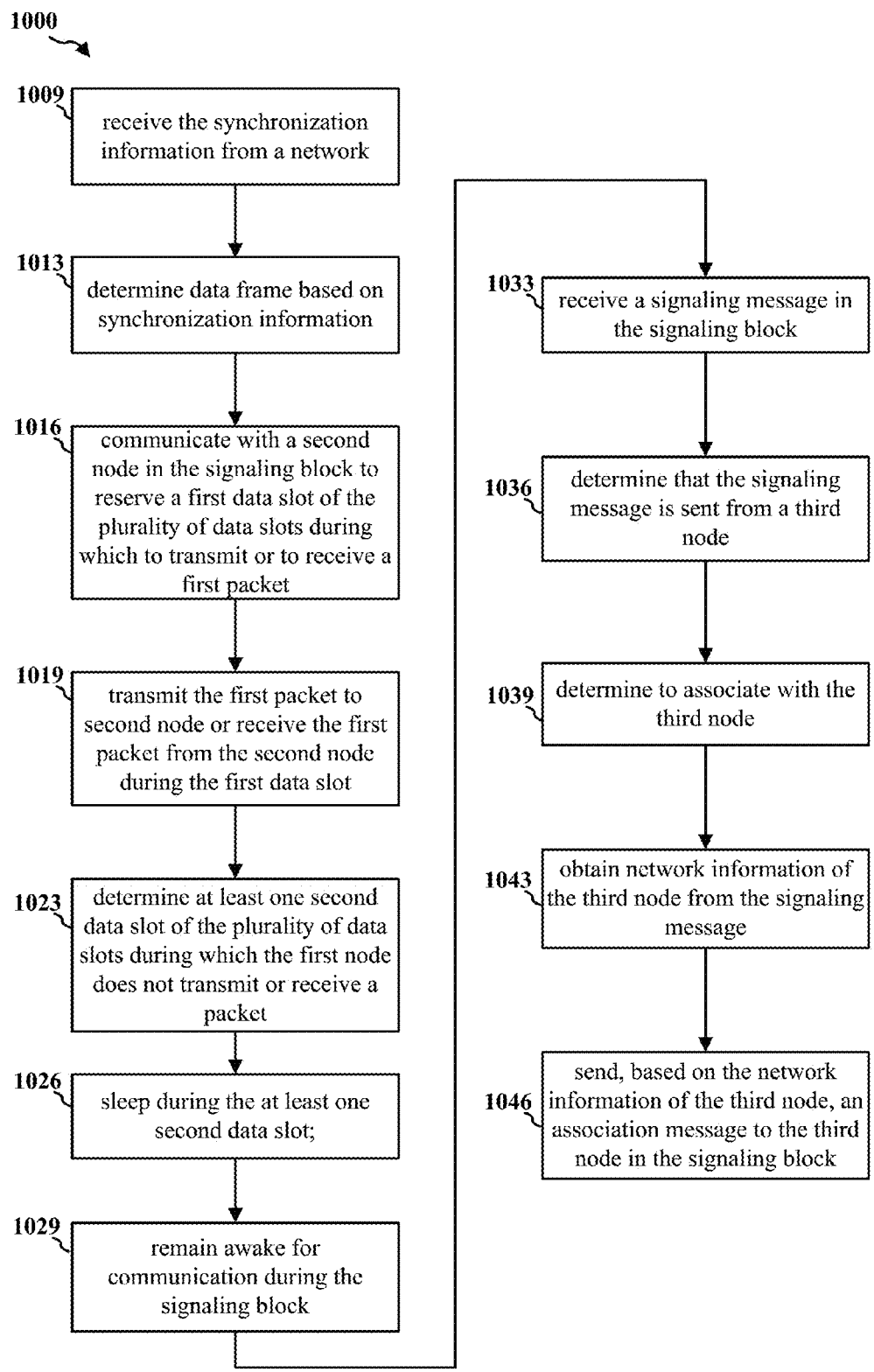
FIG. 10 is a flow chart of a method of wireless communication.

FIG. 10 is a flow chart 1000 of a method of wireless communication. The method may be performed by a first node (e.g., the IoE devices of the wireless IoE network A 251 to the wireless IoE network F 256, the apparatus 1302/1302'). In certain configurations, at operation 1009, the first node receives the synchronization information from a network. For example, referring to FIG. 2, the IoE devices of the wireless IoE network A 251 to the wireless IoE network F 256 receive synchronization signals from the eNB 212. At operation 1013, the first node determines a data frame based on synchronization information. For example, referring to FIG. 4, the IoE devices in the wireless IoE network A 251 may determine, based on the synchronization signals from the eNB 212, a start point of the frames transmitted on the channel A 312. Further, with the knowledge of the periodicity (i.e., D) of the discovery frames, the IoE devices may determine that the $N^{th}$ frame is a discovery frame and that the $(N+D)^{th}$ frame is a discovery frame.

The data frame has a signaling block and a plurality of data slots. The signaling block is prior to the plurality of data slots. In certain configurations, the signaling block includes a plurality of element periods each corresponding to one slot of the plurality of data slots. In certain configurations, the plurality of data slots includes $M_1$ prioritized slots and $M_2$ contention slots, $M_1$ and $M_2$ each being an integer. The $M_1$ prioritized slots are allocated for priority based traffic. The $M_2$ contention slots are allocated for contention based traffic. For example, referring to FIG. 8, the data block 816 may contain $M_0$ data slots that include $M_1$ prioritized slots (P-Slots) and $M_2$ contention slots (C-Slots). Accordingly, the signaling block 812 contains $M_0$ element periods that include $M_1$ prioritized element periods (P-Elements) and $M_2$ contention element periods (C-Elements). That is, each element period of the $M_1$ prioritized element periods corresponds to a respective data slot of the $M_1$ prioritized slots. Each element period of the $M_2$ contention element periods corresponds to a respective data slot of the $M_2$ contention slots.

At operation 1016, the first node communicates with a second node in the signaling block to reserve a first data slot of the plurality of data slots during which to transmit or receive a first packet. In certain configurations, the communication with the second node is performed in an element period corresponding to the first data slot. At operation 1019, the first node transmits the first packet to second node or receiving the first packet from the second node during the first data slot. In certain configurations, at operation 1023 the first node determines at least one second data slot of the plurality of data slots during which the first node does not transmit or receive a packet. At operation 1026, the first node sleeps during the at least one second data slot. At operation 1029, the first node remains awake for communication during the signaling block.

For example, referring to FIG. 8, the IoE device 221 may communicate reservation messages (e.g., RTS/CTS) with the IoE device 222 in the prioritized element period 822 of a frame to reserve the prioritized slot 842 of the frame to transmit a first packet of priority based traffic. When the IoE device 222 receives an RTS transmitted from the IoE device 221 in the prioritized element period 822, the IoE device 222 can determine that the prioritized element period 822 is a prioritized element period and corresponds to the prioritized slot 842. The IoE device 222 may transmit a CTS to the IoE device 221 in response in the prioritized element period 822. Through the exchange of RTS/CTS, the IoE device 221 and the IoE device 222 communicated and confirmed that the IoE device 221 may transmit one or more packets (data) to the IoE device 222 in the prioritized slot 842. The IoE device 221 remains awake in the prioritized slot 842 to transmit the one or more packets to the IoE device 222. The IoE device 222 remains awake in the prioritized slot 842 to receive the one or more packets from the IoE device 222. The IoE device 223 may communicate reservation messages (e.g., RTS/CTS) with the IoE device 224 in the contention element period 832 of the frame to reserve the contention slot 852 of the frame to transmit a second packet of contention based traffic. When the IoE device 224 receives an RTS transmitted from the IoE device 223 in the contention element period 832, the IoE device 224 can determine that the contention element period 832 is a contention element period and corresponds to the contention slot 852. The IoE device 224 may transmit a CTS to the IoE device 223 in response in the contention element period 832. Through the exchange of RTS/CTS, the IoE device 223 and the IoE device 224 communicated and confirmed that the IoE device 223 may transmit one or more packets (data) to the IoE device 224 in the contention slot 852. The IoE device 223 remains awake in the contention slot 852 to transmit the one or more packets to the IoE device 224. The IoE device 224 remains awake in the contention slot 852 to receive the one or more packets from the IoE device 224. Subsequently, the IoE device 221 may transmit the first packet to the IoE device 222 in the prioritized slot 842 of the frame. When there is no other data transmission at the IoE device 221 and the IoE device 222, the IoE device 221 and the IoE device 222 can sleep during the data slots of the data block 816 other than the prioritized slot 842. The IoE device 223 may transmit the second packet to the IoE device 224 in the contention slot 852 of the frame. When there is no other data transmission at the IoE device 223 and the IoE device 224, the IoE device 223 and the IoE device 224 can sleep during the data slots of the data block 816 other than the contention slot 852.

In certain configurations, the first node, at operation 1033, receives a signaling message in the signaling block. At operation 1036, the first node determines that the signaling message is sent from a third node. At operation 1039, the first node determines to associate with the third node. At operation 1043, the first node obtains network information of the third node from the signaling message. At operation 1046, the first node sends, based on the network information of the third node, an association message to the third node in the signaling block. The association message requests associating with the third node. For example, referring to FIG. 8, the IoE device 226, before joining the wireless IoE network A 251, may desire to associate with the wireless IoE network A 251 by associating with any of the IoE devices 221-225. The IoE device 226 can listen for messages transmitted by the IoE devices of the wireless IoE network A 251 (i.e., the IoE devices 221-225) in the prioritized element periods 820 and the contention element periods 830. The messages contain identity information, network information, and other information that can be used by the IoE device 226 to send an association request. Upon obtaining information of a target IoE device (e.g., the IoE device 225), the IoE device 226 can send an association request to the target IoE device in one of the association element periods (e.g., the association element period 860).

Figure 11:
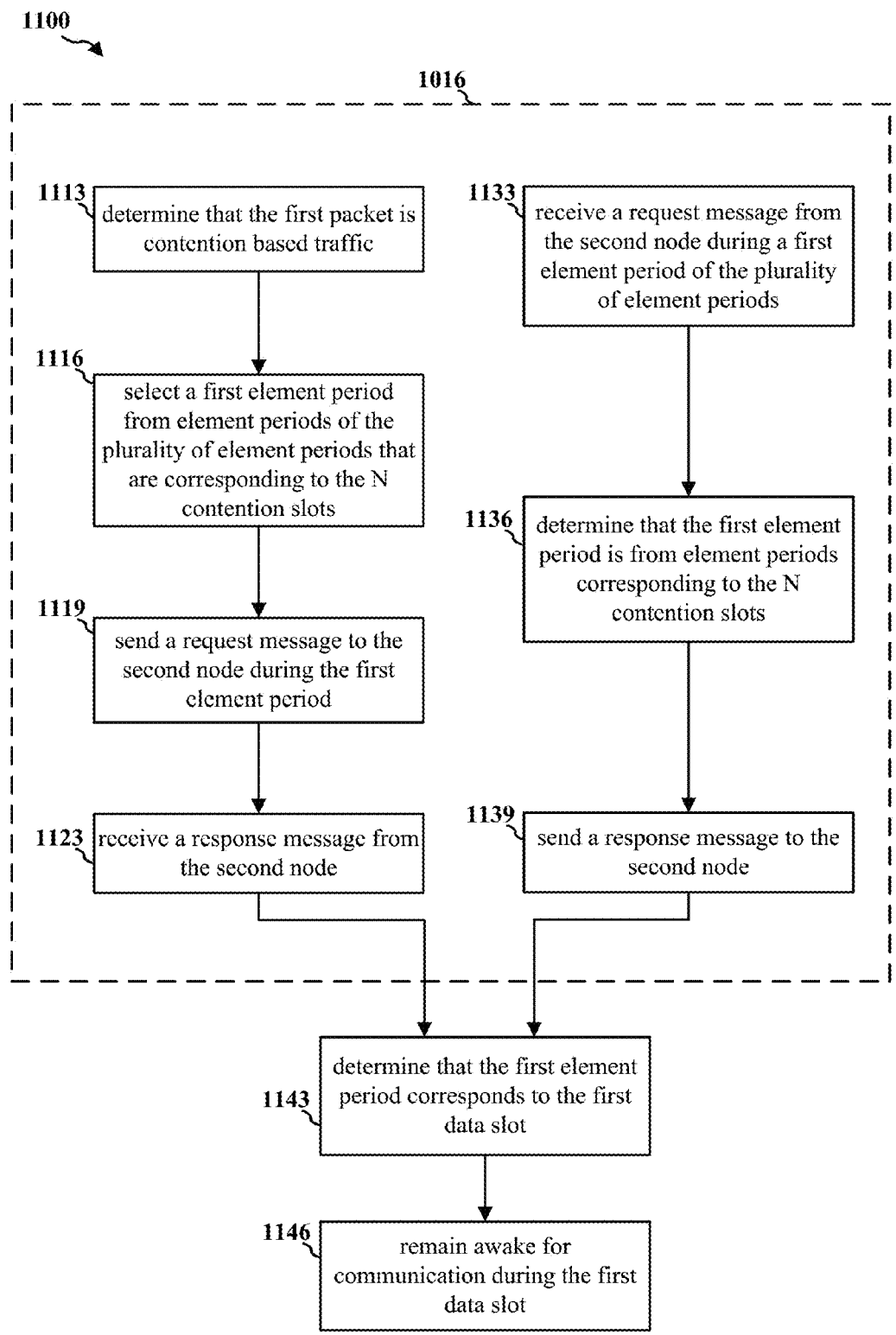
FIG. 11 is a flow chart of another method of wireless communication.

FIG. 11 is a flow chart 1100 of a method of wireless communication. The method may be performed by a first node (e.g., the IoE devices of the wireless IoE network A 251 to the wireless IoE network F 256, the apparatus 1302/ 1302'). In certain configurations, within operation 1016, the first node, at operation 1113, determines that the first packet is contention based traffic. At operation 1116, the first node selects a first element period from element periods of the plurality of element periods that are corresponding to the $M_2$ contention slots. The communication with the second node is performed during the first element period. At operation 1119, the first node sends a request message to the second node. At operation 1123, the first node receives a response message from the second node. In certain configurations, the communication with the second node in operation 1016 is performed during a first element period of the plurality of element periods. Within operation 1016, the first node, at operation 1133, receives a request message from the second node. At operation 1136, the first node determines that the first element period is from element periods corresponding to the $M_2$ contention slots. At operation 1139, the first node sends a response message to the second node. Further, in certain configurations, subsequent to operation 1123 or operation 1139, at operation 1143, the first node determines that the first element period corresponds to the first data slot. The first data slot is one of the $M_2$ contention slots. At operation 1146, the first node remains awake for communication during the first data slot. The first packet is transmitted to the second node during the first data slot. The examples described supra with respect to FIG. 10 apply here equally.

Figure 12:
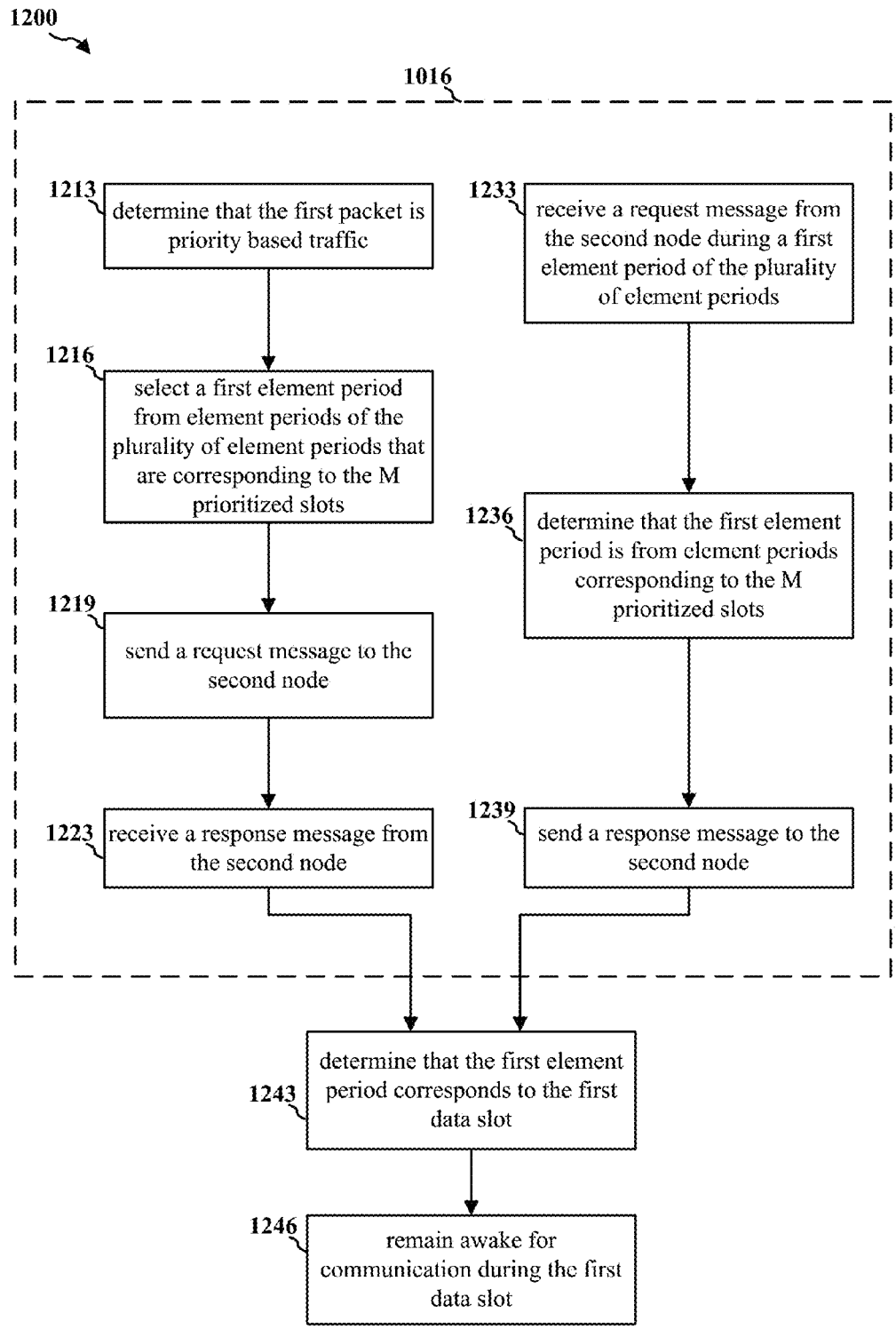
FIG. 12 is a flow chart of yet another method of wireless communication.

FIG. 12 is a flow chart 1200 of a method of wireless communication. The method may be performed by a first node (e.g., the IoE devices of the wireless IoE network A 251 to the wireless IoE network F 256, the apparatus 1302/ 1302'). In certain configurations, within operation 1016, the first node, at operation 1213, determines that the first packet is priority based traffic. At operation 1216, the first node selects a first element period from element periods of the plurality of element periods that are corresponding to the $M_1$ prioritized slots. The communication with the second node is performed during the first element period. At operation 1219, the first node sends a request message to the second node. At operation 1223, the first node receives a response message from the second node. In certain configurations, the communication with the second node in operation 1016 is performed during a first element period of the plurality of element periods. Within operation 1016, the first node, at operation 1233, receives a request message from the second node, at operation 1236, the first node determines that the first element period is from element periods corresponding to the $M_1$ prioritized slots. At operation 1239, the first node sends a response message to the second node. Further, in certain configurations, subsequent to operation 1223 or operation 1239, at operation 1243, the first node determines that the first element period corresponds to the first data slot. The first data slot is one of the $M_1$ prioritized slots. At operation 1246, the first node remains awake for communication during the first data slot. The first packet is transmitted to the second node during the first data slot. The examples described supra with respect to FIG. 10 apply here equally.

Figure 13:
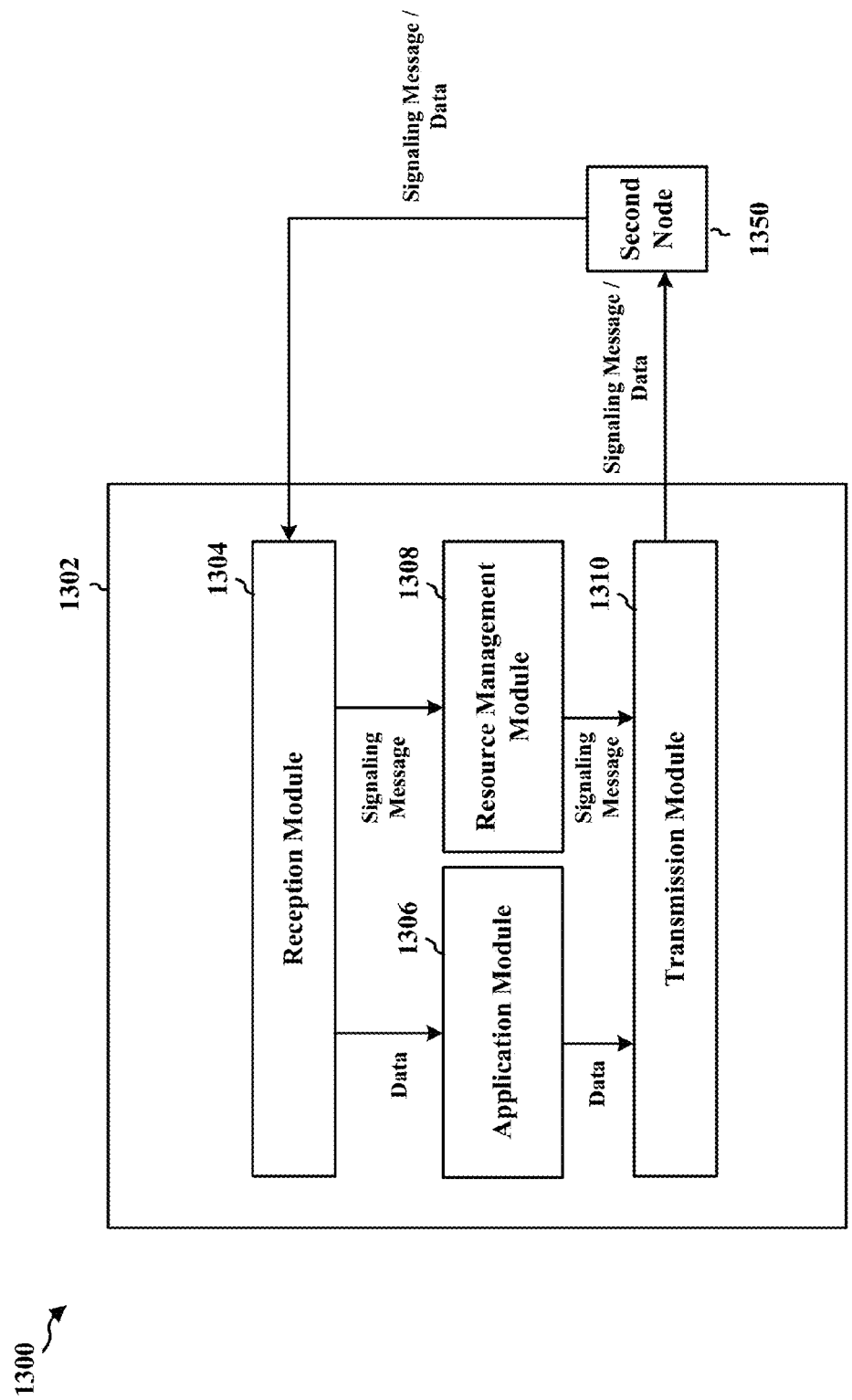
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a first node. The apparatus includes a reception module 1304, an application module 1306, a resource management module 1308, and a transmission module 1310. The apparatus 1302/1302' for wireless communication may be configured to receive first signaling messages and first data from a second node 1350. The reception module 1304 may be configured to send the first signaling messages to the resource management module 1308 and send the first data to the application module 1306 for processing. Subsequently, the resource management module 1308 may be configured to send second signaling messages to the transmission module 1310. The application module 1306 may be configured to send second data to the transmission module 1310. The transmission module 1310 may be configured to send the second signaling messages and the second data to the second node 1350.

More specifically, the resource management module 1308 may be configured to determine a data frame based on synchronization information. The data frame has a signaling block and a plurality of data slots. The signaling block is prior to the plurality of data slots. The resource management module 1308 may be configured to communicate with a second node 1350 in the signaling block to reserve a first data slot of the plurality of data slots during which to transmit or to receive a first packet. The application module 1306 and/or the transmission module 1310 may be configured to transmit the first packet to second node 1350 or receive the first packet from the second node 1350 during the first data slot.

The resource management module 1308 may be configured to determine at least one second data slot of the plurality of data slots during which the first node does not transmit or receive a packet. The reception module 1304 and/or the transmission module 1310 may be configured to sleep during the at least one second data slot. The reception module 1304 and/or the transmission module 1310 may be configured to remain awake for communication during the signaling block. The signaling block may include a plurality of element periods each corresponding to one slot of the plurality of data slots. The communication with the second node 1350 may be performed in an element period corresponding to the first data slot. The plurality of data slots may include $M_1$ prioritized slots and $M_2$ contention slots, $M_1$ and $M_2$ each being an integer. The $M_1$ prioritized slots may be allocated for priority based traffic. The $M_2$ contention slots are allocated for contention based traffic.

The resource management module 1308 may be configured to determine that the first packet is contention based traffic. The resource management module 1308 may be configured to select a first element period from element periods of the plurality of element periods that are corresponding to the $M_2$ contention slots. The resource management module 1308 may be configured to perform the communication with the second node 1350 during the first element period. To perform the communication with the second node 1350, the resource management module 1308 may be configured to send a request message to the second node 1350. The resource management module 1308 may be configured to receive a response message from the second node 1350. The resource management module 1308 may be configured to determine that the first element period corresponds to the first data slot. The first data slot may be one of the $M_2$ contention slots. The reception module 1304 and/or the transmission module 1310 may be configured to remain awake for communication during the first data slot. The first packet is transmitted to the second node 1350 during the first data slot.

The resource management module 1308 may be configured to perform the communication with the second node 1350 during a first element period of the plurality of element periods. To perform the communication with the second node 1350, the resource management module 1308 may be configured to receive a request message from the second node 1350. The resource management module 1308 may be configured to determine that the first element period is from element periods corresponding to the $M_2$ contention slots. The resource management module 1308 may be configured to send a response message to the second node 1350. The resource management module 1308 may be configured to determine that the first element period corresponds to the first data slot. The first data slot may be one of the $M_2$ contention slots. The reception module 1304 and/or the transmission module 1310 may be configured to remaining awake for communication during the first data slot. The first packet is received from the second node 1350 during the first data slot.

The resource management module 1308 may be configured to determine that the first packet is priority based traffic. The resource management module 1308 may be configured to select a first element period from element periods of the plurality of element periods that are corresponding to the $M_1$ prioritized slots. The resource management module 1308 may be configured to perform the communication with the second node 1350 during the first element period. To perform the communication with the second node 1350, the resource management module 1308 may be configured to send a request message to the second node 1350. The resource management module 1308 may be configured to receive a response message from the second node 1350. The resource management module 1308 may be configured to determine that the first element period corresponds to the first data slot. The first data slot is one of the $M_1$ prioritized slots. The reception module 1304 and/or the transmission module 1310 may be configured to remain awake for communication during the first data slot. The first packet is transmitted to the second node 1350 during the first data slot.

The resource management module 1308 may be configured to perform the communication with the second node 1350 during a first element period of the plurality of element periods. To perform the communication with the second node 1350, the resource management module 1308 may be configured to receive a request message from the second node 1350. The resource management module 1308 may be configured to determine that the first element period is from element periods corresponding to the $M_1$ prioritized slots. The resource management module 1308 may be configured to send a response message to the second node 1350. The resource management module 1308 may be configured to determine that the first element period corresponds to the first data slot. The first data slot is one of the $M_1$ prioritized slots. The reception module 1304 and/or the transmission module 1310 may be configured to remain awake for communication during the first data slot. The first packet may be received from the second node 1350 during the first data slot.

The reception module 1304 may be configured to receive the synchronization information from a network. The reception module 1304 may be configured to receive a signaling message in the signaling block. The resource management module 1308 may be configured to determine that the signaling message is sent from a third node. The resource management module 1308 may be configured to determine to associate with the third node. The resource management module 1308 may be configured to obtain network information of the third node from the signaling message. The resource management module 1308 may be configured to send, based on the network information of the third node, an association message to the third node in the signaling block. The association message requests associating with the third node.

Figure 14:
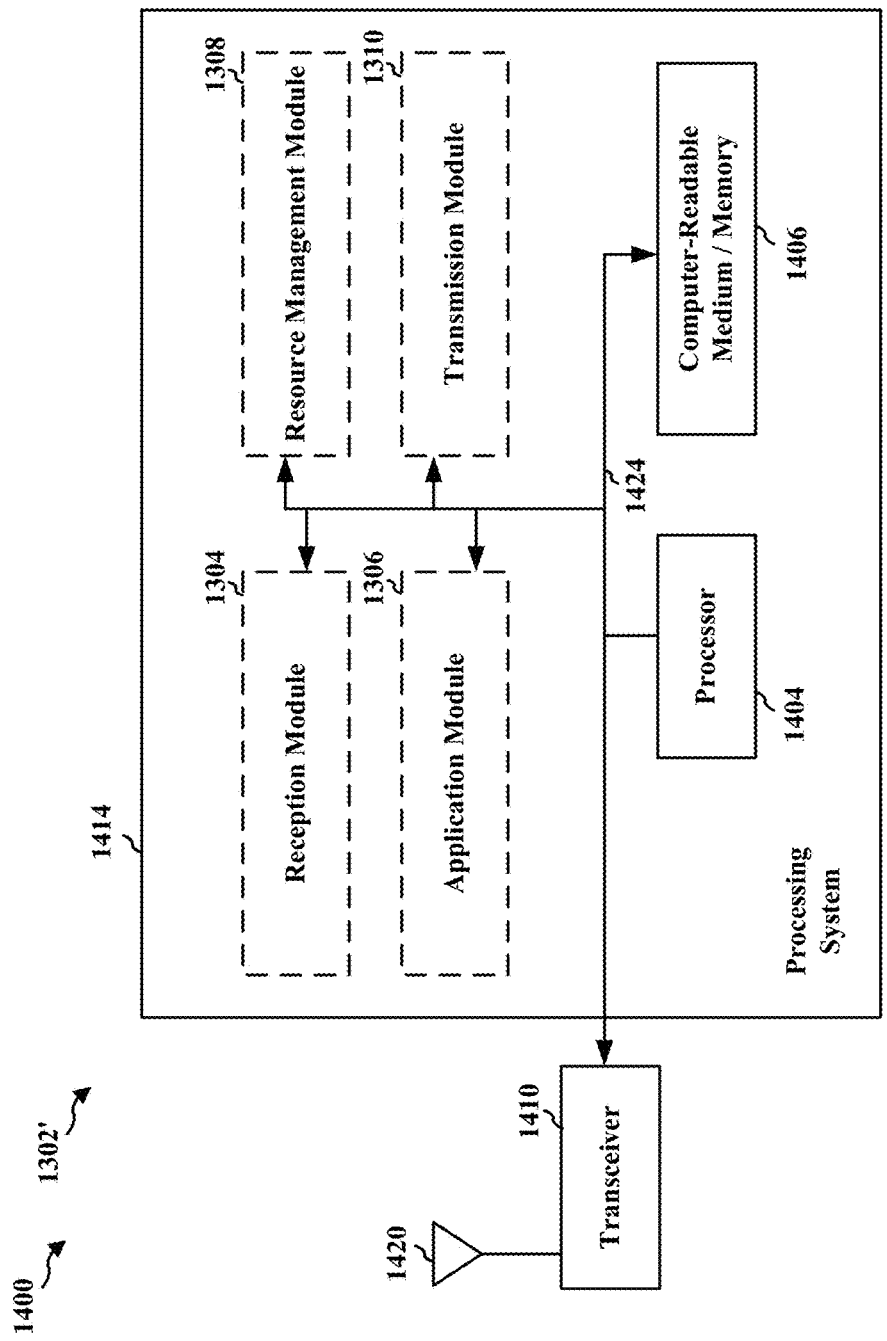
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception module 1304. In addition, the transceiver 1410 receives information from the processing system 1414, specifically the transmission module 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, 1308, and 1310. The modules may be software modules running in the processor 1404, resident/stored in the computer readable medium/memory 1406, one or more hardware modules coupled to the processor 1404, or some combination thereof.

The processing system 1414 may be a component of the IoE devices of the wireless IoE network A 251 to the wireless IoE network F 256. In one configuration, the apparatus 1302/1302' for wireless communication includes means for performing operations illustrated in FIGS. 10-12. Specifically, the apparatus 1302/1302' for wireless communication includes means for determining a data frame based on synchronization information. The data frame has a signaling block and a plurality of data slots. The signaling block is prior to the plurality of data slots. The apparatus 1302/1302' for wireless communication includes means for communicating with a second node in the signaling block to reserve a first data slot of the plurality of data slots during which to transmit or to receive a first packet. The apparatus 1302/1302' for wireless communication includes means for transmitting the first packet to second node or receiving the first packet from the second node during the first data slot.

The apparatus 1302/1302' for wireless communication may be configured to include means for determining at least one second data slot of the plurality of data slots during which the first node does not transmit or receive a packet. The apparatus 1302/1302' for wireless communication may be configured to include means for sleeping during the at least one second data slot. The apparatus 1302/1302' for wireless communication may be configured to include means for remaining awake for communication during the signaling block.

The signaling block may include a plurality of element periods each corresponding to one slot of the plurality of data slots. The communication with the second node is performed in an element period corresponding to the first data slot. The plurality of data slots includes $M_1$ prioritized slots and $M_2$ contention slots, $M_1$ and $M_2$ each being an integer. The $M_1$ prioritized slots are allocated for priority based traffic. The $M_2$ contention slots are allocated for contention based traffic.

The apparatus 1302/1302' for wireless communication may be configured to include means for determining that the first packet is contention based traffic. The apparatus 1302/1302' for wireless communication may be configured to include means for selecting a first element period from element periods of the plurality of element periods that are corresponding to the $M_2$ contention slots. The means for communicating with the second node may be configured to perform the communication with the second node during the first element period. To perform the communication with the second node, the means for communicating with the second node may be configured to send a request message to the second node and to receive a response message from the second node. The apparatus 1302/1302' for wireless communication may be configured to include means for determining that the first element period corresponds to the first data slot. The first data slot is one of the $M_2$ contention slots. The apparatus 1302/1302' for wireless communication may be configured to include means for remaining awake for communication during the first data slot. The first packet is transmitted to the second node during the first data slot.

The means for communicating with the second node may be configured to perform the communication with the second node during a first element period of the plurality of element periods. To perform the communication with the second node, the means for communicating with the second node may be configured to receive a request message from the second node, to determine that the first element period is from element periods corresponding to the $M_2$ contention slots, and to send a response message to the second node. The apparatus 1302/1302' for wireless communication may be configured to include means for determining that the first element period corresponds to the first data slot. The first data slot is one of the $M_2$ contention slots. The apparatus 1302/1302' for wireless communication may be configured to include means for remaining awake for communication during the first data slot. The first packet is received from the second node during the first data slot.

The apparatus 1302/1302' for wireless communication may be configured to include means for determining that the first packet is priority based traffic. The apparatus 1302/1302' for wireless communication may be configured to include means for selecting a first element period from element periods of the plurality of element periods that are corresponding to the $M_1$ prioritized slots. The means for communicating with the second node may be configured to perform the communication with the second node during the first element period. To perform the communication with the second node, the means for communicating with the second node may be configured to send a request message to the second node and to receive a response message from the second node. The apparatus 1302/1302' for wireless communication may be configured to include means for determining that the first element period corresponds to the first data slot. The first data slot is one of the $M_1$ prioritized slots. The apparatus 1302/1302' for wireless communication may be configured to include means for remaining awake for communication during the first data slot. The first packet is transmitted to the second node during the first data slot.

The means for communicating with the second node may be configured to perform the communication with the second node during a first element period of the plurality of element periods. To perform the communication with the second node, the means for communicating with the second node may be configured to receive a request message from the second node, to determine that the first element period is from element periods corresponding to the $M_1$ prioritized slots, and to send a response message to the second node. The apparatus 1302/1302' for wireless communication may be configured to include means for determining that the first element period corresponds to the first data slot. The first data slot is one of the $M_1$ prioritized slots. The apparatus 1302/1302' for wireless communication may be configured to include means for remaining awake for communication during the first data slot. The first packet is received from the second node during the first data slot.

The apparatus 1302/1302' for wireless communication may be configured to include means for receiving a signaling message in the signaling block. The apparatus 1302/1302' for wireless communication may be configured to include means for determining that the signaling message is sent from a third node. The apparatus 1302/1302' for wireless communication may be configured to include means for determining to associate with the third node. The apparatus 1302/1302' for wireless communication may be configured to include means for obtaining network information of the third node from the signaling message. The apparatus 1302/1302' for wireless communication may be configured to include means for sending, based on the network information of the third node, an association message to the third node in the signaling block. The association message requests associating with the third node. The apparatus 1302/1302' for wireless communication may be configured to include means for receiving the synchronization information from a network.

The aforementioned means may be one or more of the aforementioned modules of the apparatus 1302 and/or the processing system 1414 of the apparatus 1302' configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a first node, comprising:
   determining a data frame based on timing synchronization information, wherein the data frame has a signaling block and a plurality of data slots, wherein the signaling block is prior to the plurality of data slots;
   communicating with a second node in the signaling block to reserve a first data slot of the plurality of data slots during which to transmit or to receive a first packet; and
   transmitting the first packet to the second node or receiving the first packet from the second node during the first data slot,
   wherein the plurality of data slots includes M1 prioritized slots and M2 contention slots, M1 and M2 each being an integer, wherein the M1 prioritized slots are allocated for priority based traffic, and wherein the M2 contention slots are allocated for contention based traffic.

2. The method of claim 1, further comprising:
   determining at least one second data slot of the plurality of data slots during which the first node does not transmit or receive a packet;
   sleeping during the at least one second data slot; and remaining awake for communication during the signaling block.

3. The method of claim 1, wherein the signaling block includes a plurality of element periods each corresponding to one slot of the plurality of data slots; and
wherein the communicating with the second node is performed in an element period corresponding to the first data slot.

4. A method of wireless communication at a first node, comprising:
determining a data frame based on synchronization information, wherein the data frame has a signaling block and a plurality of data slots, wherein the signaling block is prior to the plurality of data slots;
communicating with a second node in the signaling block to reserve a first data slot of the plurality of data slots during which to transmit or to receive a first packet; and
transmitting the first packet to the second node or receiving the first packet from the second node during the first data slot;
wherein the signaling block includes a plurality of element periods each corresponding to one slot of the plurality of data slots;
wherein the communicating with the second node is performed in an element period corresponding to the first data slot; and
wherein the plurality of data slots includes M1 prioritized slots and M2 contention slots, M1 and M2 each being an integer, wherein the M1 prioritized slots are allocated for priority based traffic, and wherein the M2 contention slots are allocated for contention based traffic.

5. The method of claim 4, further comprising:
determining that the first packet is contention based traffic; and
selecting a first element period from element periods of the plurality of element periods that are corresponding to the M2 contention slots, wherein the communicating with the second node is performed during the first element period and includes
sending a request message to the second node, and
receiving a response message from the second node;
determining that the first element period corresponds to the first data slot, wherein the first data slot is one of the M2 contention slots; and
remaining awake for communication during the first data slot, wherein the first packet is transmitted to the second node during the first data slot.

6. The method of claim 4, wherein the communicating with the second node is performed during a first element period of the plurality of element periods and includes
receiving a request message from the second node,
determining that the first element period is from element periods corresponding to the M2 contention slots, and
sending a response message to the second node;
the method further comprising:
determining that the first element period corresponds to the first data slot, wherein the first data slot is one of the M2 contention slots; and
remaining awake for communication during the first data slot, wherein the first packet is received from the second node during the first data slot.

7. The method of claim 4, further comprising:
determining that the first packet is priority based traffic; and
selecting a first element period from element periods of the plurality of element periods that are corresponding to the M1 prioritized slots, wherein the communicating with the second node is performed during the first element period and includes
sending a request message to the second node, and
receiving a response message from the second node;
determining that the first element period corresponds to the first data slot, wherein the first data slot is one of the M1 prioritized slots; and
remaining awake for communication during the first data slot, wherein the first packet is transmitted to the second node during the first data slot.

8. The method of claim 4, wherein the communicating with the second node is performed during a first element period of the plurality of element periods and includes
receiving a request message from the second node,
determining that the first element period is from element periods corresponding to the M1 prioritized slots, and
sending a response message to the second node;
the method further comprising:
determining that the first element period corresponds to the first data slot, wherein the first data slot is one of the M1 prioritized slots; and
remaining awake for communication during the first data slot, wherein the first packet is received from the second node during the first data slot.

9. The method of claim 1, further comprising:
receiving a signaling message in the signaling block;
determining that the signaling message is sent from a third node;
determining to associate with the third node;
obtaining network information of the third node from the signaling message; and
sending, based on the network information of the third node, an association message to the third node in the signaling block, wherein the association message requests associating with the third node.

10. The method of claim 1, further comprising receiving the timing synchronization information from a network.

11. An apparatus for wireless communication, the apparatus being a first node, comprising:
means for determining a data frame based on timing synchronization information, wherein the data frame has a signaling block and a plurality of data slots, wherein the signaling block is prior to the plurality of data slots;
means for communicating with a second node in the signaling block to reserve a first data slot of the plurality of data slots during which to transmit or to receive a first packet; and
means for transmitting the first packet to the second node or receiving the first packet from the second node during the first data slot,
wherein the plurality of data slots includes M1 prioritized slots and M2 contention slots, M1 and M2 each being an integer, wherein the M1 prioritized slots are allocated for priority based traffic, and wherein the M2 contention slots are allocated for contention based traffic.

12. The apparatus of claim 11, further comprising:
means for determining at least one second data slot of the plurality of data slots during which the first node does not transmit or receive a packet;
means for sleeping during the at least one second data slot; and
means for remaining awake for communication during the signaling block.

13. The apparatus of claim 11, wherein the signaling block includes a plurality of element periods each corresponding to one slot of the plurality of data slots; and
wherein the communicating with the second node is performed in an element period corresponding to the first data slot.

14. An apparatus for wireless communication, the apparatus being a first node, comprising:
means for determining a data frame based on synchronization information, wherein the data frame has a signaling block and a plurality of data slots, wherein the signaling block is prior to the plurality of data slots;
means for communicating with a second node in the signaling block to reserve a first data slot of the plurality of data slots during which to transmit or to receive a first packet; and
means for transmitting the first packet to the second node or receiving the first packet from the second node during the first data slot;
wherein the signaling block includes a plurality of element periods each corresponding to one slot of the plurality of data slots;
wherein the communicating with the second node is performed in an element period corresponding to the first data slot; and
wherein the plurality of data slots includes M1 prioritized slots and M2 contention slots, M1 and M2 each being an integer, wherein the M1 prioritized slots are allocated for priority based traffic, and wherein the M2 contention slots are allocated for contention based traffic.

15. The apparatus of claim 14, further comprising:
means for determining that the first packet is contention based traffic; and
means for selecting a first element period from element periods of the plurality of element periods that are corresponding to the M2 contention slots, wherein the means for communicating with the second node is configured to perform the communication with the second node during the first element period, wherein to perform the communication with the second node, the means for communicating with the second node is configured to
send a request message to the second node, and
receive a response message from the second node;
means for determining that the first element period corresponds to the first data slot, wherein the first data slot is one of the M2 contention slots; and
means for remaining awake for communication during the first data slot, wherein the first packet is transmitted to the second node during the first data slot.

16. The apparatus of claim 14, wherein the means for communicating with the second node is configured to perform the communication with the second node during a first element period of the plurality of element periods, wherein to perform the communication with the second node, the means for communicating with the second node is configured to
receive a request message from the second node,
determine that the first element period is from element periods corresponding to the M2 contention slots, and
send a response message to the second node;
the apparatus further comprising:
means for determining that the first element period corresponds to the first data slot, wherein the first data slot is one of the M2 contention slots; and
means for remaining awake for communication during the first data slot, wherein the first packet is received from the second node during the first data slot.

17. The apparatus of claim 14, further comprising:
means for determining that the first packet is priority based traffic; and
means for selecting a first element period from element periods of the plurality of element periods that are corresponding to the M1 prioritized slots, wherein the means for communicating with the second node is configured to perform the communication with the second node during the first element period, wherein to perform the communication with the second node, the means for communicating with the second node is configured to
send a request message to the second node, and
receive a response message from the second node;
means for determining that the first element period corresponds to the first data slot, wherein the first data slot is one of the M1 prioritized slots; and
means for remaining awake for communication during the first data slot, wherein the first packet is transmitted to the second node during the first data slot.

18. The apparatus of claim 14, wherein the means for communicating with the second node is configured to perform the communication with the second node during a first element period of the plurality of element periods, wherein to perform the communication with the second node, the means for communicating with the second node is configured to
receive a request message from the second node,
determine that the first element period is from element periods corresponding to the M1 prioritized slots, and
send a response message to the second node;
the apparatus further comprising:
means for determining that the first element period corresponds to the first data slot, wherein the first data slot is one of the M1 prioritized slots; and
means for remaining awake for communication during the first data slot, wherein the first packet is received from the second node during the first data slot.

19. The apparatus of claim 11, further comprising:
means for receiving a signaling message in the signaling block;
means for determining that the signaling message is sent from a third node;
means for determining to associate with the third node;
means for obtaining network information of the third node from the signaling message; and
means for sending, based on the network information of the third node, an association message to the third node in the signaling block, wherein the association message requests associating with the third node.

20. The apparatus of claim 11, further comprising means for receiving the timing synchronization information from a network.

21. An apparatus for wireless communication, the apparatus being a first node, comprising:
a memory; and
at least one processor coupled to the memory and configured to:
determine a data frame based on timing synchronization information, wherein the data frame has a signaling block and a plurality of data slots, wherein the signaling block is prior to the plurality of data slots;

communicate with a second node in the signaling block to reserve a first data slot of the plurality of data slots during which to transmit or to receive a first packet; and transmit the first packet to the second node or receiving the first packet from the second node during the first data slot, wherein the plurality of data slots includes M1 prioritized slots and M2 contention slots, M1 and M2 each being an integer, wherein the M1 prioritized slots are allocated for priority based traffic, and wherein the M2 contention slots are allocated for contention based traffic.

22. The apparatus of claim 21, wherein the at least one processor is further configured to:
determine at least one second data slot of the plurality of data slots during which the first node does not transmit or receive a packet;
sleep during the at least one second data slot; and
remain awake for communication during the signaling block.

23. The apparatus of claim 21, wherein the signaling block includes a plurality of element periods each corresponding to one slot of the plurality of data slots; and
wherein the communicating with the second node is performed in an element period corresponding to the first data slot.

24. An apparatus for wireless communication, the apparatus being a first node, comprising:
a memory; and
at least one processor coupled to the memory and configured to:
determine a data frame based on timing synchronization information, wherein the data frame has a signaling block and a plurality of data slots, wherein the signaling block is prior to the plurality of data slots;
communicate with a second node in the signaling block to reserve a first data slot of the plurality of data slots during which to transmit or to receive a first packet; and
transmit the first packet to the second node or receiving the first packet from the second node during the first data slot;
wherein the signaling block includes a plurality of element periods each corresponding to one slot of the plurality of data slots;
wherein the communicating with the second node is performed in an element period corresponding to the first data slot; and
wherein the plurality of data slots includes M1 prioritized slots and M2 contention slots, M1 and M2 each being an integer, wherein the M1 prioritized slots are allocated for priority based traffic, and wherein the M2 contention slots are allocated for contention based traffic.

25. The apparatus of claim 24, wherein the at least one processor is further configured to:
determine that the first packet is contention based traffic; and
select a first element period from element periods of the plurality of element periods that are corresponding to the M2 contention slots, wherein the at least one processor is further configured to perform the communication with the second node during the first element period, wherein to perform the communication with the second node, the at least one processor is further configured to
send a request message to the second node, and
receive a response message from the second node;
determine that the first element period corresponds to the first data slot, wherein the first data slot is one of the M2 contention slots; and
remain awake for communication during the first data slot, wherein the first packet is transmitted to the second node during the first data slot.

26. The apparatus of claim 24, wherein the at least one processor is further configured to perform the communication with the second node during a first element period of the plurality of element periods, wherein to perform the communication with the second node, the at least one processor is further configured to
receive a request message from the second node,
determine that the first element period is from element periods corresponding to the M2 contention slots, and
send a response message to the second node;
wherein the at least one processor is further configured to:
determine that the first element period corresponds to the first data slot, wherein the first data slot is one of the M2 contention slots; and
remain awake for communication during the first data slot, wherein the first packet is received from the second node during the first data slot.

27. The apparatus of claim 24, wherein the at least one processor is further configured to:
determine that the first packet is priority based traffic; and
select a first element period from element periods of the plurality of element periods that are corresponding to the M1 prioritized slots, wherein the at least one processor is further configured to perform the communication with the second node during the first element period, wherein to perform the communication with the second node, the at least one processor is further configured to
send a request message to the second node, and
receive a response message from the second node;
determine that the first element period corresponds to the first data slot, wherein the first data slot is one of the M1 prioritized slots; and
remain awake for communication during the first data slot, wherein the first packet is transmitted to the second node during the first data slot.

28. The apparatus of claim 24, wherein the at least one processor is further configured to perform the communication with the second node during a first element period of the plurality of element periods, wherein to perform the communication with the second node, the at least one processor is further configured to
receive a request message from the second node,
determine that the first element period is from element periods corresponding to the M1 prioritized slots, and
send a response message to the second node;
wherein the at least one processor is further configured to:
determine that the first element period corresponds to the first data slot, wherein the first data slot is one of the M1 prioritized slots; and
remain awake for communication during the first data slot, wherein the first packet is received from the second node during the first data slot.

29. The apparatus of claim 21, wherein the at least one processor is further configured to:
receive the timing synchronization information from a network;
receive a signaling message in the signaling block;

determine that the signaling message is sent from a third node;

determine to associate with the third node;

obtain network information of the third node from the signaling message; and send, based on the network information of the third node, an association message to the third node in the signaling block, wherein the association message requests associating with the third node.

30. A non-transitory computer-readable medium storing computer executable code for wireless communication, comprising code for:

determining a data frame based on timing synchronization information, wherein the data frame has a signaling block and a plurality of data slots, wherein the signaling block is prior to the plurality of data slots;

communicating with a second node in the signaling block to reserve a first data slot of the plurality of data slots during which to transmit or to receive a first packet; and transmitting the first packet to the second node or receiving the first packet from the second node during the first data slot, wherein the plurality of data slots includes M1 prioritized slots and M2 contention slots, M1 and M2 each being an integer, wherein the M1 prioritized slots are allocated for priority based traffic, and wherein the M2 contention slots are allocated for contention based traffic.

\* \* \* \* \*